United States Patent
Tang et al.

(10) Patent No.: US 12,333,983 B2
(45) Date of Patent: Jun. 17, 2025

(54) DISPLAY DRIVE METHOD BASED ON FRAME DATA, ELECTRONIC DEVICE, AND STORAGE MEDIUM

(71) Applicant: HONOR DEVICE CO., LTD., Shenzhen (CN)

(72) Inventors: Jiehua Tang, Shenzhen (CN); Yanfeng Jia, Shenzhen (CN); Yue Ding, Shenzhen (CN); Peng Wang, Shenzhen (CN); Yanling Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/010,300

(22) PCT Filed: Aug. 25, 2022

(86) PCT No.: PCT/CN2022/114949
§ 371 (c)(1),
(2) Date: Dec. 14, 2022

(87) PCT Pub. No.: WO2023/045695
PCT Pub. Date: Mar. 30, 2023

(65) Prior Publication Data
US 2024/0290241 A1    Aug. 29, 2024

(30) Foreign Application Priority Data

Sep. 22, 2021 (CN) ........................... 202111109277.4
Dec. 24, 2021 (CN) ........................... 202111599977.6

(51) Int. Cl.
*G09G 3/20* (2006.01)
*G06T 5/92* (2024.01)

(52) U.S. Cl.
CPC ............. *G09G 3/2007* (2013.01); *G06T 5/92* (2024.01); *G06T 2207/10016* (2013.01);
(Continued)

(58) Field of Classification Search
CPC ......... G09G 3/2007; G09G 2320/0276; G09G 2320/066; G09G 2360/16; G09G 2370/00;
(Continued)

(56) References Cited

U.S. PATENT DOCUMENTS 11,122,245 B2    9/2021   Oh
11,145,039 B2   10/2021   Huang et al.
(Continued)

FOREIGN PATENT DOCUMENTS

CN    104299574 A    1/2015
CN    108053381 A    5/2018
(Continued)

*Primary Examiner* — Abhishek Sarma

(57) ABSTRACT

This application provides a display drive method based on frame data, an electronic device, and a storage medium. The method includes: receiving to-be-displayed frame data, and calculating an APL percentage of the frame data by using an analysis unit; performing HDR processing on the frame data based on the APL percentage of the frame data, and transmitting the frame data obtained through HDR processing to a display driver circuit; and driving, by the display driver circuit based on the APL percentage of the frame data, a display to display the frame data obtained through HDR processing.

18 Claims, 21 Drawing Sheets

(52) U.S. Cl.
CPC .............. *G06T 2207/20208* (2013.01); *G09G 2320/0276* (2013.01); *G09G 2320/066* (2013.01); *G09G 2360/16* (2013.01); *G09G 2370/00* (2013.01)

(58) Field of Classification Search
CPC .. G09G 5/006; G09G 2320/0673; G09G 5/10; G09G 5/005; G09G 2370/04; G09G 3/32; G09G 3/3208; G09G 3/3225; G09G 3/36; G09G 2360/12; G06T 5/92; G06T 2207/10016; G06T 2207/20208
See application file for complete search history.

(56) References Cited

U.S. PATENT DOCUMENTS

| | | |
|---|---|---|
| 11,158,678 B2 | 10/2021 | Inoue |
| 2015/0062099 A1 | 3/2015 | Jeon |
| 2015/0062187 A1 | 3/2015 | Park |
| 2018/0018932 A1 | 1/2018 | Atkins |
| 2018/0204542 A1 | 7/2018 | Saito |
| 2019/0252471 A1* | 8/2019 | Inoue ........................ G09F 9/30 |
| 2019/0378253 A1* | 12/2019 | Huang ...................... G06T 5/20 |

FOREIGN PATENT DOCUMENTS

| | | |
|---|---|---|
| CN | 109891486 A | 6/2019 |
| CN | 110444170 A | 11/2019 |
| CN | 111357286 A | 6/2020 |
| CN | 111599295 A | 8/2020 |
| CN | 111754946 A | 10/2020 |
| KR | 20170135569 A | 12/2017 |
| WO | 2016098992 A1 | 6/2016 |

\* cited by examiner

DISPLAY DRIVE METHOD BASED ON FRAME DATA, ELECTRONIC DEVICE, AND STORAGE MEDIUM

CROSS-REFERENCE TO RELATED APPLICATIONS

This application is a National Stage of International Application No. PCT/CN2022/114949, filed Aug. 25, 2022, which claims priority to Chinese Patent Application No. 202111599977.6, filed Dec. 24, 2021 and Chinese Patent Application No. 202111109277.4, filed Sep. 22, 2021, each of which are hereby incorporated by reference in their entireties.

TECHNICAL FIELD

This application relates to the field of screen display technologies, and in particular, to a display drive method based on frame data, an electronic device, and a storage medium.

BACKGROUND

With the development of intelligent electronic devices such as smartphones and personal computers, a requirement for video and image display quality has become higher. HDR display is performed on a video or an image, so that display quality can be improved. However, a manner of performing HDR processing on video or image data is usually relatively fixed, and does not match a characteristic of to-be-displayed video or image data, resulting in a poor display effect of the video or the image.

SUMMARY

Based on the foregoing content, it is necessary to provide a display drive method based on frame data, an electronic device, and a storage medium, to resolve a poor display effect problem of a video or an image due to a fact that a manner of performing HDR processing on video or image data does not match a characteristic of to-be-displayed video or image data.

According to a first aspect, this application provides a display drive method based on frame data. The method includes: receiving to-be-displayed frame data, and calculating an APL percentage of the frame data by using an analysis unit; performing HDR processing on the frame data based on the APL percentage of the frame data, and transmitting the frame data obtained through HDR processing to the display driver circuit; and driving, by the display driver circuit based on the APL percentage of the frame data, a display to display the frame data obtained through HDR processing. According to the foregoing technical solution, the APL percentage of the to-be-displayed frame data may be intelligently identified, and HDR processing may be performed on the to-be-displayed frame data based on the APL percentage of the to-be-displayed frame data, so that an HDR processing manner of the frame data matches a characteristic of the frame data, to optimize a display effect of the display on the frame data.

In a possible implementation, the calculating an APL percentage of the frame data by using an analysis unit includes: calculating, by the analysis unit, a sum of ratios of grayscale values of all pixels in the frame data to a quantity of pixels, to obtain an APL percentage of the frame data. According to the foregoing technical solution, the APL percentage of the frame data may be obtained through accurate calculation.

In a possible implementation, the calculating an APL percentage of the frame data by using an analysis unit further includes: determining, by the analysis unit based on the APL percentage of the frame data and a preset coefficient, an APL percentage of the frame data. According to the foregoing technical solution, the APL percentage of the frame data may be adjusted in a customized way based on the preset coefficient, so that the frame data displayed on the display can be presented with different effects.

In a possible implementation, the analysis unit is a processor or a digital signal processor, or includes the processor and the display driver circuit. According to the foregoing technical solution, a hardware framework may be flexibly disposed based on the APL percentage of the frame data when the frame data is displayed.

In a possible implementation, the method further includes: if the analysis unit is the processor or the digital signal processor, transmitting, to the display driver circuit by using the analysis unit, APL interval information in which the APL percentage of the frame data falls. According to the foregoing technical solution, the display driver circuit does not need to calculate the APL percentage of the frame data, but receives the APL interval information of the frame data from the processor or the digital signal processor, to simplify function setting of the display driver circuit.

In a possible implementation, the transmitting, to the display driver circuit by using the analysis unit, APL interval information in which the APL percentage of the frame data falls includes: determining an APL interval in which the APL percentage of the frame data falls; generating a corresponding status command based on the APL interval information in which the APL percentage of the frame data falls; and transmitting the status command to the display driver circuit. According to the foregoing technical solution, the APL interval information of the frame data may be transmitted to the display driver circuit in a timely manner.

In a possible implementation, the generating a corresponding status command includes: recording, in a CMD command, the APL interval information in which the APL percentage of the frame data falls, and using the CMD command recording the APL interval information as a status command corresponding to the APL interval. According to the foregoing technical solution, rapid transmission of the status command can be implemented.

In a possible implementation, the transmitting the status command to the display driver circuit includes: transmitting, to the display driver circuit in a preset time sequence, the status command together with the frame data. According to the foregoing technical solution, the status command including the APL interval information of the frame data may be transmitted to the display driver circuit synchronously with the frame data, so that the display driver circuit can drive the display in a timely manner to display the frame data.

In a possible implementation, the transmitting, to the display driver circuit in a preset time sequence, the status command together with the frame data includes: placing the status command at a start location or an end location of to-be-transmitted frame data; forming, by the frame data including the status command, a data stream in a time sequence, and sending, to the display driver circuit in a time sequence, the frame data including the status command; determining whether a feedback signal of the display driver circuit is received; and if it is determined that the feedback signal of the display driver circuit is received, transmitting, in a time sequence, next frame data that includes a status command and that is in the data stream; or if it is determined that no feedback signal of the display driver circuit is received, suspending transmission of the frame data in the data stream. According to the foregoing technical solution, transmission efficiency of the status command and the frame data can be improved, and a tearing phenomenon of the display can be prevented.

In a possible implementation, the generating a corresponding status command includes: determining a quantity of pulses based on the APL interval in which the APL percentage of the frame data falls; generating, based on the quantity of pulses, a PWM signal by using a GPIO interface; and using the PWM signal as a status command corresponding to the APL interval. According to the foregoing technical solution, the status command may be transmitted in a digital signal form without performing digital-to-analog conversion, to effectively improve transmission efficiency and reduce noise.

In a possible implementation, the transmitting the status command to the display driver circuit includes: transmitting the status command to the display driver circuit by using a mobile industry processor interface, a general-purpose input/output interface, a serial transmission bus, an improved serial transmission bus, or a serial peripheral interface. According to the foregoing technical solution, a hardware framework used for transmitting the status command may be customized, to implement flexible hardware configuration.

In a possible implementation, the performing HDR processing on the frame data based on the APL percentage of the frame data, and transmitting the frame data obtained through HDR processing to the display driver circuit includes: determining an HDR effect curve based on an APL interval in which the APL percentage of the frame data falls; performing HDR processing on the frame data based on the HDR effect curve; and transmitting the frame data obtained through HDR processing to the display driver circuit. According to the foregoing technical solution, an HDR processing manner of the frame data is enabled to match a characteristic of the frame data, and increases a dynamic range when the frame data is displayed, to optimize a display effect.

In a possible implementation, the determining an HDR effect curve based on an APL interval in which the APL percentage of the frame data falls includes: determining, based on the APL interval in which the APL percentage of the frame data falls and a correspondence between a preset APL interval and threshold brightness of the display, threshold brightness corresponding to the APL interval; and determining, from a plurality of preset HDR effect curves, an HDR effect curve corresponding to the threshold brightness. According to the foregoing technical solution, an HDR effect curve may be selected based on the APL interval of the frame data, so that an HDR processing manner of the frame data matches a characteristic of the frame data, to optimize a display effect of the frame data.

In a possible implementation, the performing HDR processing on the frame data based on the HDR effect curve includes: performing tone mapping processing on the frame data based on the determined HDR effect curve, and mapping initial grayscale data of each pixel in the frame data to grayscale data within a display brightness range of the display, where the grayscale data includes brightness and a tone. According to the foregoing technical solution, HDR processing may be performed on the grayscale data of each pixel in the frame data, to optimize a display effect of the frame data.

In a possible implementation, the driving, by the display driver circuit based on the APL percentage of the frame data, a display to display the frame data obtained through HDR processing includes: setting a display parameter of the display based on the APL interval in which the APL percentage of the frame data falls; and driving, based on the display parameter, the display to display the frame data obtained through HDR processing. According to the foregoing technical solution, the display parameter may be preset, to improve display efficiency of the frame data.

In a possible implementation, the display parameter includes a display brightness threshold and grayscale data of a pixel, and the setting a display parameter of the display based on the APL interval in which the APL percentage of the frame data falls includes: determining, based on a correspondence between the APL interval and the display brightness threshold, a display brightness threshold that is of the screen and that corresponds to the APL interval in which the APL percentage of the frame data falls; obtaining grayscale data of each pixel in the frame data obtained through HDR processing; and setting a display brightness value of the display to the display brightness threshold, and setting to-be-displayed grayscale data of each pixel in the frame data to the grayscale data obtained through tone mapping. According to the foregoing technical solution, the frame data obtained through HDR processing may be displayed at peak brightness corresponding to the APL interval, to optimize a display effect of the frame data.

In a possible implementation, the driving, based on the display parameter, the display to display the frame data obtained through HDR processing includes: driving, by the display driver circuit, the display to display, by using the display brightness threshold, the frame data obtained through HDR processing, so that brightness of each pixel in the frame data displayed on the display reaches set brightness in the grayscale data, and a tone of each pixel in the frame data displayed on the display reaches a set tone in the grayscale data. According to the foregoing technical solution, local area highlight display and high dynamic range display of the frame data can be implemented, to optimize a display effect of the frame data.

In a possible implementation, the display parameter further includes a local Gamma value of the frame data obtained through HDR processing, and the driving, based on the display parameter, the display to display the frame data obtained through HDR processing includes: driving, by the display driver circuit, the display to display, by using the display brightness threshold, the frame data obtained through HDR processing, so that the brightness of each pixel in the frame data displayed on the display reaches the set brightness in the grayscale data, and the tone of each pixel in the frame data displayed on the display reaches the set tone in the grayscale data; and performing local Gamma correction on the displayed frame data based on the local Gamma value. According to the foregoing technical solution, color adjustment may be performed on the frame data displayed on the display, to optimize a display effect of the frame data.

In a possible implementation, the method further includes: determining whether an APL mode of the display driver circuit is enabled; and if it is determined that the APL mode of the display driver circuit is enabled, driving the display to display the frame data in the APL mode; or if it is determined that the APL mode of the display driver circuit is not enabled, driving the display to display the frame data in a normal mode. According to the foregoing technical solution, the display driver circuit may be switched between the APL mode and the normal mode, to meet different requirements.

According to a second aspect, this application provides an electronic device. The electronic device includes a memory and a processor, where the memory is configured to store a program instruction; and the processor is configured to read and execute the program instruction stored in the memory, and when the program instruction is executed by the processor, the electronic device is enabled to perform the foregoing display drive method based on frame data.

According to a third aspect, this application provides a computer storage medium, where the computer storage medium stores a program instruction, and when the program instruction is run on an electronic device, the electronic device is enabled to perform the foregoing display drive method based on frame data.

In addition, for technical effects brought by the second aspect and the third aspect, reference may be made to the descriptions about the design methods in the foregoing method embodiment. Details are not described herein again.

According to the display drive method based on frame data, the electronic device and the storage medium provided in embodiments of this application, the APL percentage of the to-be-displayed frame data may be intelligently identified, and HDR processing may be performed on the to-be-displayed frame data based on the APL percentage of the to-be-displayed frame data, so that an HDR processing manner of the frame data matches a characteristic of the frame data, to optimize a display effect of the display on the frame data, thereby effectively improving a visual effect when a user browses the frame data.

DESCRIPTION OF EMBODIMENTS

For ease of understanding, some concepts related to embodiments of this application are explained as examples for reference.

It should be noted that, the terms "first" and "second" used in embodiments of this application are used for descriptive purposes only, and cannot be construed as indicating or implying relative importance or implicitly indicating the quantity of technical features indicated. Therefore, the features defined with "first" and "second" may explicitly or implicitly include one or more of the features. In the descriptions of embodiments of this application, the words such as "for example" and "such as" are used to mean an example, an illustration, or a description. In embodiments of this application, any embodiment or design solution described as "for example" or "such as" shall not be explained as being more preferred or advantageous than other embodiments or design solutions. Specifically, use of the words "for example" and "such as" is intended to present a relevant concept in a specific way.

Unless otherwise defined, all technical and scientific terms as used herein have the same meanings as those usually understood by a person skilled in the art of this application. The terms used in the specification of this application are only used to describe particular embodiments, but not intended to limit this application. It should be understood that, unless otherwise stated in this application, "/" means "or". For example, A/B may mean A or B. In this application, "and/or" is merely used to describe an association relationship between associated objects, and indicates that three relationships may exist. For example, A and/or B may indicate three cases: Only A exists, both A and B exist, and only B exists. "At least one" means one or more. "A plurality of" means two or more. For example, "at least one of a, b, or c" may represent seven cases: "a", "b", "c", "a and b", "a and c", "b and c", and "a, b, and c".

An APL (Average Picture Level, average picture level) is a ratio of a quantity of pixels illuminated in an image to a total quantity of pixels. Because different content is displayed in different images, a quantity of illuminated pixels is different, and corresponding APL percentages are also different. Therefore, an APL percentage may represent a display characteristic of an image.

Figure 1:
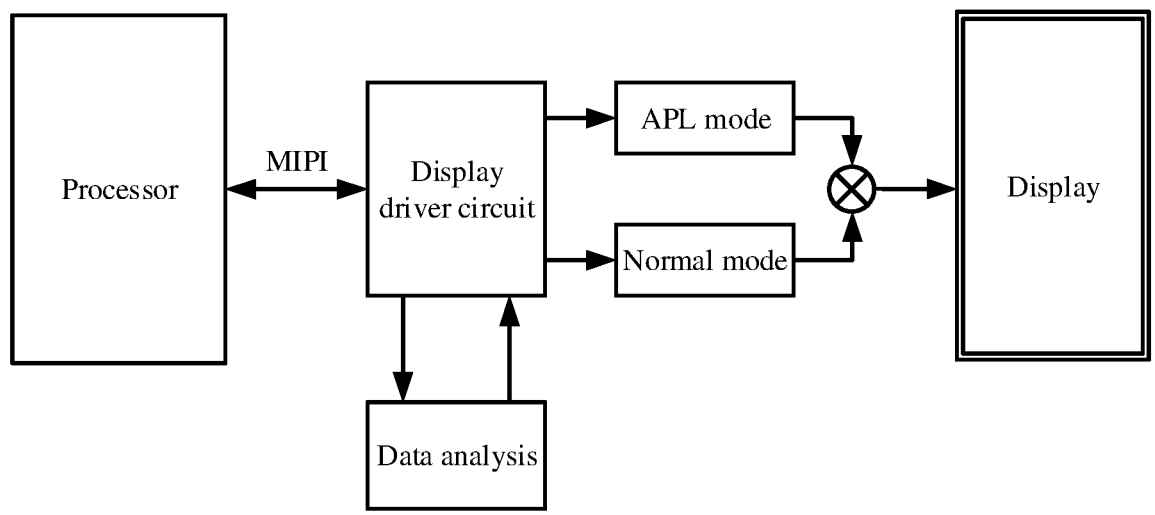
FIG. 1 is a schematic diagram of an architecture in which an electronic device drives, based on frame data, a display to display a picture in the conventional technology.

FIG. 1 is a schematic diagram of an architecture in which an electronic device drives, based on frame data, a display to display a picture in the conventional technology. In the conventional technology, when an image is displayed on a display, brightness is usually determined based on brightness information initially set by a system, and does not dynamically change based on an APL percentage of the image. Alternatively, a fixed APL mode is preset in an electronic device, such as an APL 1% mode or an APL 2% mode. In the APL mode, brightness of a display is determined based on an APL percentage of an image, and is different from brightness initially set by a system. For example, brightness of the display is higher than the brightness initially set by the system, to enhance a display effect of the image.

A preset APL mode is an APL 1% mode is used as an example for description. The processor transmits, to a display driver circuit (Display Driver IC, DDIC), to-be-displayed video frame data or image frame data after HDR (High Dynamic Range, high dynamic range) processing, and the display driver circuit determines whether an APL percentage of the frame data is 1%. If it is determined that the APL percentage of the frame data is 1%, the display driver circuit drives a display to display the frame data in the APL mode; or if it is determined that the APL percentage of the frame data is not 1%, the display driver circuit drives a display to display the frame data in a normal mode. In the normal mode, the frame data is displayed on the display based on the brightness initially set by the system. However, the display driver circuit cannot automatically analyze and identify APL percentages other than a preset APL percentage of the frame data. In this way, the electronic device cannot drive, based on different APL percentages at different brightness, the display to display different frame data. In addition, an HDR processing manner of the frame data is not associated with an APL percentage of the frame data, and therefore a video or an image after HDR processing does not match a characteristic of video or image data, resulting in a poor display effect of the video or the image.

Figure 2:
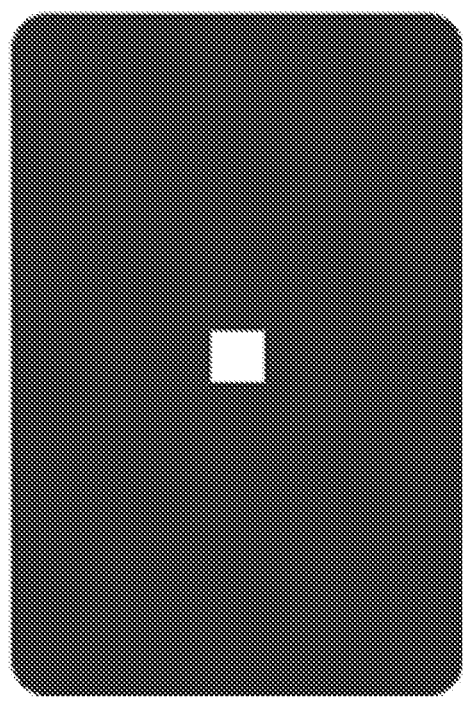
FIG. 2 shows an APL 1% image according to an embodiment of this application.

FIG. 2 shows a typical APL 1% image. If the APL percentage of the frame data is 1%, for example, the frame data is the image in FIG. 2, where the image includes a local white area. In the APL mode, when the display driver circuit drives, based on a display brightness value corresponding to the APL 1% such as peak brightness 1500 nit (nit), the display to display the image, brightness of the white area is the peak brightness 1500 nit. In the normal mode, brightness of the display when the image is displayed is consistent with the initially set brightness of the display. In this case, brightness of the white area may not be the peak brightness. However, different frame data may have different APL percentages, and the display driver circuit cannot automatically analyze the different APL percentages of the frame data. Therefore, the display driver circuit cannot dynamically drive, based on the APL percentages, the display at different brightness to display the frame data, resulting in a poor display effect of the frame data.

In addition, because the display has limited display brightness, when brightness of a source image far exceeds maximum display brightness of the display, for example, partial area brightness of the source image is 10000 nit, but the maximum display brightness of the display is 1500 nit, if a video or an image obtained through HDR processing does not match a characteristic of video or image data, color cast is easily caused regardless of whether the display driver circuit drives, based on the APL mode or the normal mode, the display to display the image, affecting a display effect of the image.

Figure 3:
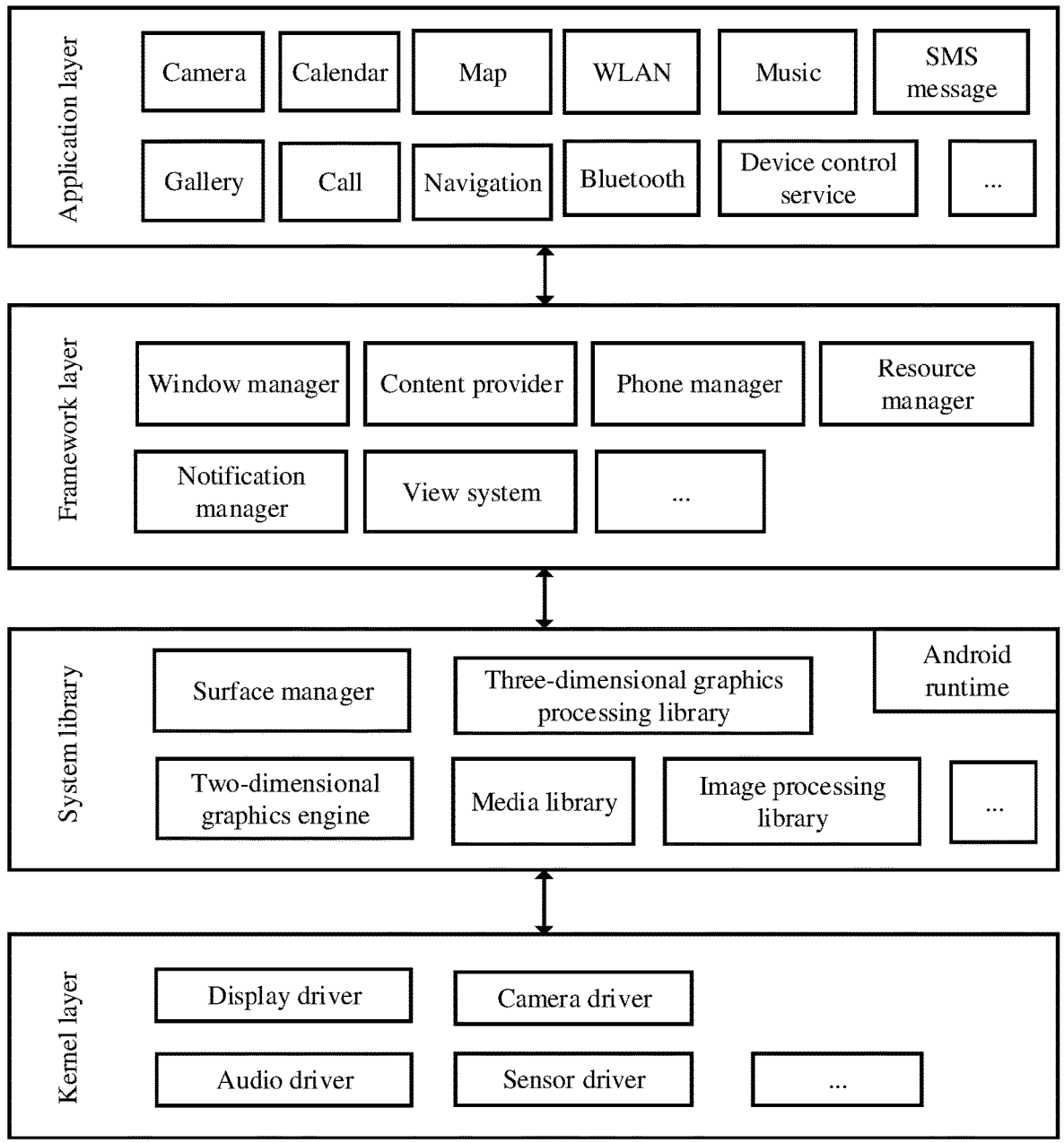
FIG. 3 is a diagram of a software architecture of an electronic device according to an embodiment of this application.

FIG. 3 is a diagram of a software architecture of an electronic device according to an embodiment of this application. A hierarchical architecture divides software into layers, and each layer has a clear role and division of labor. The layers communicate each other by using a software interface. For example, the Android system is divided into four layers: an application layer, a framework layer, Android runtime (Android runtime), a system library, and a kernel layer.

The application layer may include a series of application packages. For example, the application package may include Camera, Gallery, Calendar, Call, Map, Navigation, WLAN, Bluetooth, Music, Video, SMS message, Device control service, and another application.

The framework layer provides an application programming interface (application programming interface, API) and a programming framework for applications at the application layer. The application framework layer includes some predefined functions. For example, the application framework layer may include a window manager, a content provider, a view system, a phone manager, a resource manager, a notification manager, and the like.

The window manager is used to manage a window program. The window manager may obtain a display size, determine whether there is a status bar, lock a screen, take a screenshot, and the like. The content provider is used to store and obtain data, and enables these data to be accessible to an application. The data may include videos, images, audio, calls made and received, browsing history and bookmarks, phone books, and the like. The view system includes visual controls, such as a control for displaying text and a control for displaying pictures. The view system can be used to build an application. A display interface may include one or more views. For example, a display interface including a short message service notification icon may include a view for displaying text and a view for displaying pictures. The phone manager is used to provide a communication function of an electronic device, such as call status management (including connecting, hanging up, or the like). The resource manager provides various resources for an application, such as a localized string, an icon, a picture, a layout file, and a video file. The notification manager enables an application to display notification information in the status bar, which can be used to convey a notification-type message, and can automatically disappear after a short stay without user interaction. For example, the notification manager is used for notifying download completion or as a message reminder. The notification manager may alternatively be a notification that appears in the status bar at the top of the system in the form of a chart or scroll bar text, such as a notification for an application running in the background, or a notification that appears on the screen in the form of a dialog window. For example, text information is displayed in the status bar, a prompt tone is made, the electronic device vibrates, and an indicator lamp flashes.

The Android runtime includes a core library and a virtual machine. The Android runtime is responsible for scheduling and managing the Android system. The core library includes two parts: a function that needs to be invoked in JAVA language and a core library of the Android.

The application layer and the framework layer run on the virtual machine. The virtual machine executes JAVA files at the application layer and the framework layer as binary files. The virtual machine is configured to implement functions such as object lifecycle management, stack management, thread management, security and exception management, and garbage collection.

The system library may include a plurality of functional modules, such as a surface manager (surface manager), a media library (Media Libraries), a three-dimensional graphics processing library (for example, OpenGL ES), a 2D graphics engine (for example, SGL).

The surface manager is used to manage a display subsystem, and provides fusion of 2D and 3D layers for a plurality of applications. The media library supports a plurality of common audio and video formats for playback and recording, as well as static image files. The media library may support a plurality of audio and video coding formats, such as MPEG4, H. 264, MP3, AAC, AMR, JPG, and PNG. The three-dimensional graphics processing library is used to implement three-dimensional graphics drawing, image rendering, compositing, layer processing, and the like. The 2D graphics engine is a graphics engine for 2D graphics.

The kernel layer is a layer between hardware and software. The kernel layer includes at least a display driver, a camera driver, an audio driver, and a sensor driver.

The kernel layer is a core of an operating system of an electronic device, and is first-layer software expansion based on hardware. The kernel layer provides a most basic function of the operating system, is a basis of the operating system, and is responsible for managing a system process, a memory, a device driver, a file, and a network system, and determines performance and stability of the system. For example, a kernel may determine when an application operates on a specific piece of hardware.

The kernel layer includes a program closely related to hardware, such as an interrupt handler and a device driver, further includes a basic and common module with relatively high operating frequency, such as a clock management module, a process scheduling module, and further includes a key data structure. The kernel layer may be disposed in a processor, or may be solidified in an internal memory.

To resolve the technical problem of a poor image display effect due to the fact that the display driver circuit cannot analyze different APL percentages of frame data and an HDR processing manner of frame data does not match a characteristic of frame data, an embodiment of this application provides a display drive method based on frame data. The method is applied to an electronic device 100.

Figure 4:
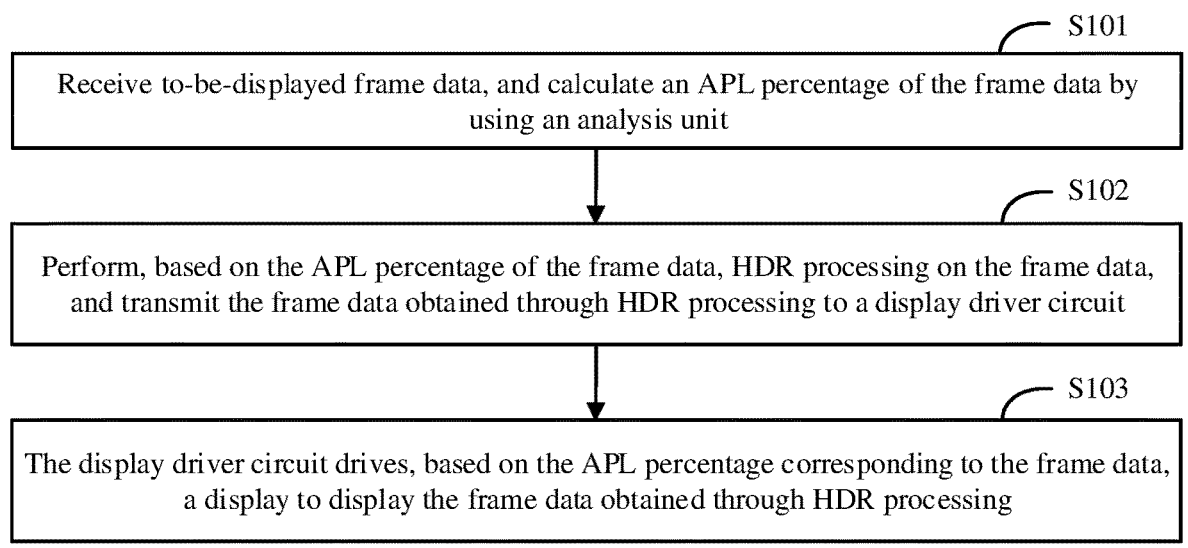
FIG. 4 is a flowchart of a display drive method based on frame data according to an embodiment of this application.

FIG. 4 is a flowchart of a display drive method based on frame data according to an embodiment of this application. The method is applied to the electronic device 100, specifically including the following steps:

S101: Receive to-be-displayed frame data, and calculate an APL percentage of the frame data by using an analysis unit.

In an embodiment of this application, the frame data may be video frame data or image frame data. The video frame data includes a plurality of images arranged in a time sequence, and the image frame data includes one image.

In an embodiment of this application, the receiving to-be-displayed frame data includes: in response to a user's operation of opening an interface including a video and/or an image, obtaining video frame data and/or image frame data on the interface by using a framework layer. If the interface includes both a video and an image, video frame data including the video and the image is obtained. Specifically, when the user opens an image on the electronic device, the image is used as image frame data. The image may be a complete image, for example, the user opens an image in a gallery or an application. Alternatively, the image may be an image including one or more complete images and an interface, for example, an application interface opened by the user includes one or more images partially displayed on a display. When the user opens a video on the electronic device, the video is used as video frame data. The video may be a complete video, for example, the user opens a video in a gallery or an application. Alternatively, the video may be a video including a complete video, image, and interface, for example, an application interface opened by the user includes a video and an image that are partially displayed on a display.

In an embodiment of this application, the calculating an APL percentage of the frame data by using an analysis unit includes: if the frame data is a video, calculating one by one, by the analysis unit based on a grayscale value of each pixel and a quantity of pixels, an APL percentage of each video frame, where each video frame is an image; or if the frame data is an image, calculating, by the analysis unit based on a grayscale value of each pixel and a quantity of pixels, an APL percentage of the image. A formula for calculating the APL percentage is:

$$APL = \sum_{i=1}^{x*y} \text{Gray}(i)/(x*y).$$

In the foregoing calculation formula, x is a quantity of x-axis pixels of the video frame or the image, y is a quantity of y-axis pixels of the video frame or the image, x*y is a total quantity of pixels of the video frame or the image, and Gray (i) is a grayscale value of each pixel.

In another embodiment, a formula for calculating the APL percentage may alternatively be:

$$APL_1 = k*APL + b = k*\sum_{i=1}^{x*y} \text{Gray}(i)/(x*y) + b.$$

In the foregoing calculation formula, x is a quantity of x-axis pixels of the video frame or the image, y is a quantity of y-axis pixels of the video frame or the image, x*y is a total quantity of pixels of the video frame or the image, Gray (i) is a grayscale value of each pixel, and k and b are preset coefficients. Optionally, the preset coefficients each are any value greater than 0. It should be noted that the coefficients may be increased on an initial APL percentage based on a display requirement, to generate an enhanced display APL percentage $APL_1$, so that different styles can be presented when the frame data is displayed on the display.

Figure 5:
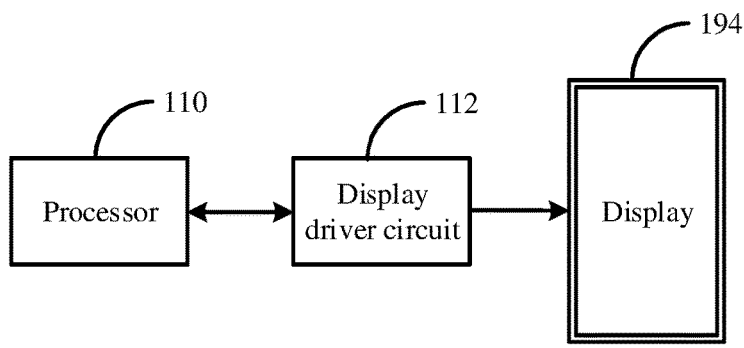
FIG. 5 is a schematic diagram of a display drive architecture of an electronic device according to an embodiment of this application.

FIG. 5 is a schematic diagram of a display drive architecture of an electronic device according to an embodiment of this application. The electronic device includes, but is not limited to, a processor 110, a display driver circuit 112, and a display 194. The processor is electrically connected to the display driver circuit, and the display driver circuit is electrically connected to the display. The processor is a master chip of the electronic device. In a first embodiment of this application, the analysis unit is the processor.

Figure 6:
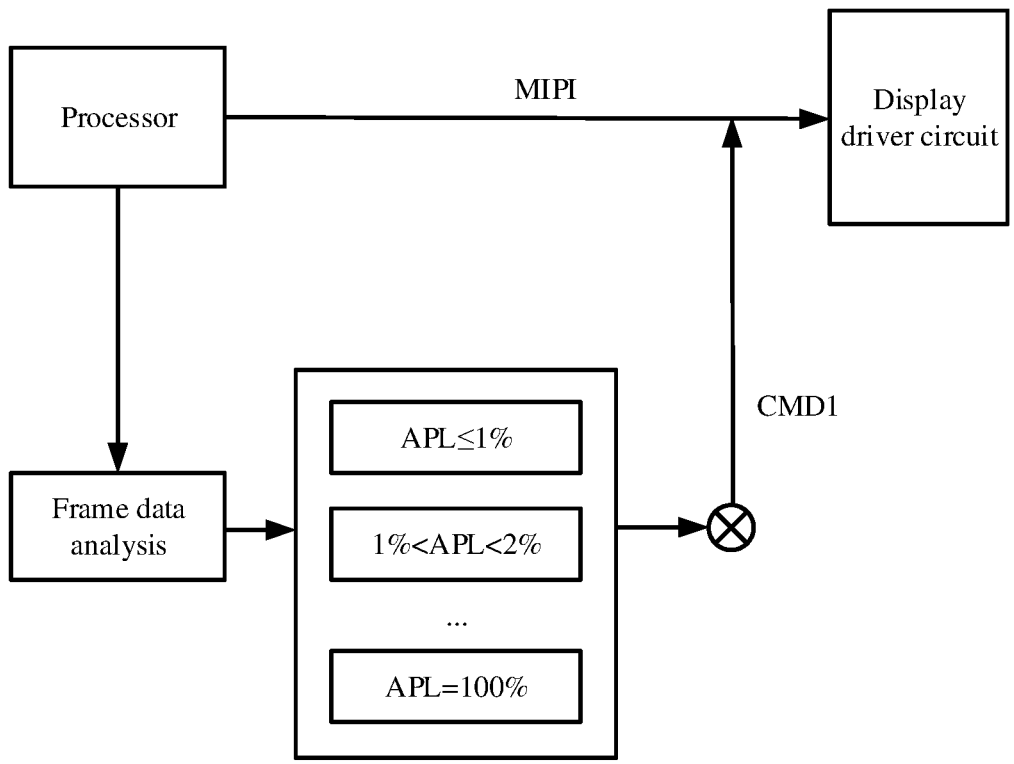
FIG. 6 is a schematic diagram of a partial application environment of a display drive method according to an embodiment of this application.

FIG. 6 is a schematic diagram of an application environment of a display drive method based on frame data according to an embodiment of this application. In the first embodiment of this application, the receiving to-be-displayed frame data, and calculating an APL percentage of the frame data by using an analysis unit includes: receiving, by the processor, to-be-displayed frame data, and calculating an APL percentage of the frame data.

Figure 7:
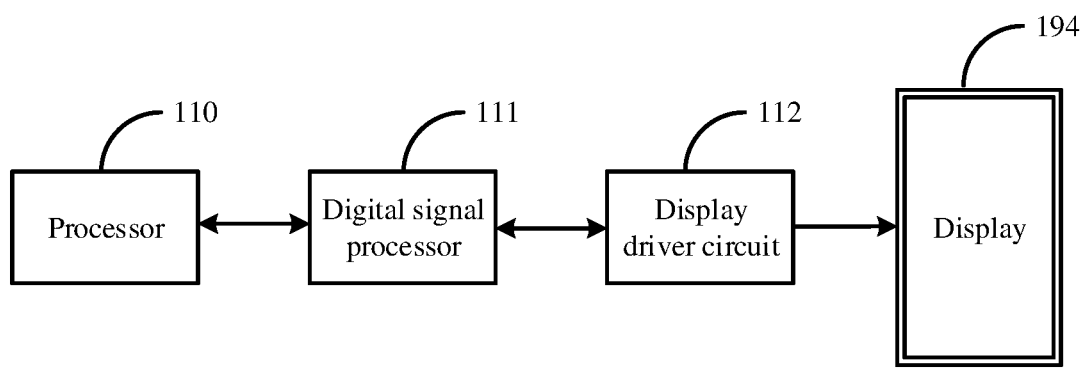
FIG. 7 is a schematic diagram of a display drive architecture of an electronic device according to another embodiment of this application.

FIG. 7 is a schematic diagram of a display drive architecture of an electronic device according to another embodiment of this application. The electronic device includes, but is not limited to, a processor 110, a digital signal processor (Display Digital Signal Processor, Display DSP) 111, a display driver circuit 112, and a display 194. The processor is electrically connected to the digital signal processor, the digital signal processor is electrically connected to the display driver circuit, and the display driver circuit is electrically connected to the display. The processor is a master chip of the electronic device. In a second embodiment of this application, the analysis unit is the digital signal processor.

Figure 8:
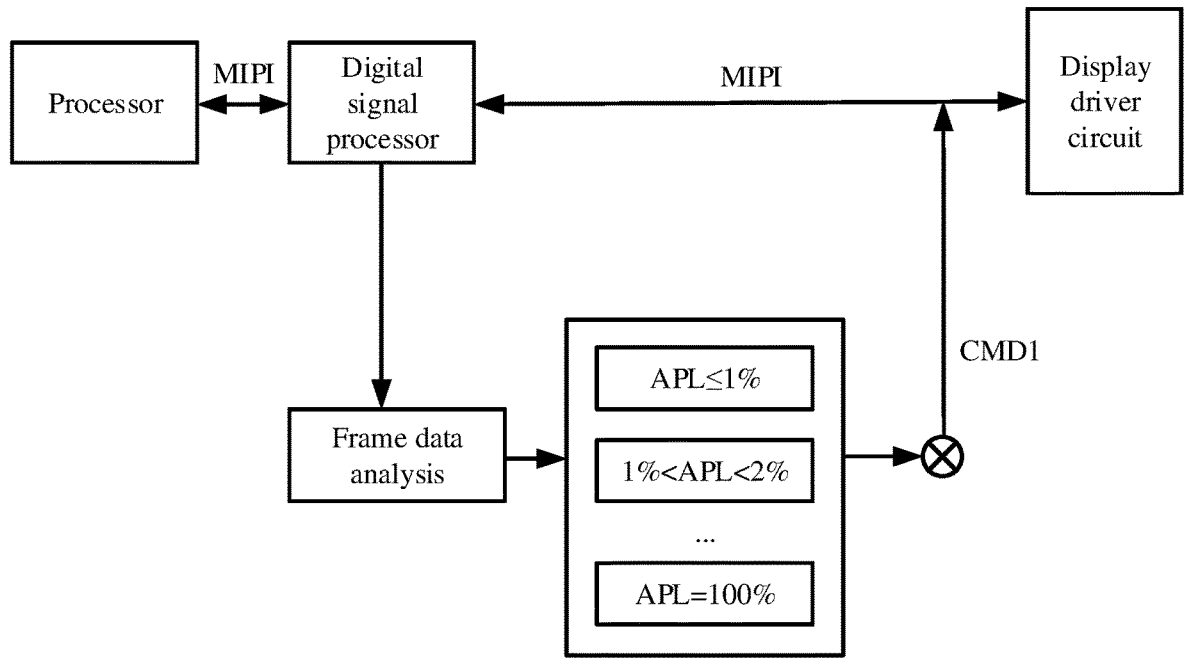
FIG. 8 is a schematic diagram of a partial application environment of a display drive method according to another embodiment of this application.

FIG. 8 is a schematic diagram of an application environment of a display drive method based on frame data according to another embodiment of this application. In the second embodiment of this application, the receiving to-be-displayed frame data, and calculating an APL percentage of the frame data by using an analysis unit includes: receiving, by the processor, to-be-displayed frame data; transmitting the received frame data to the digital signal processor; and calculating an APL percentage of the frame data by using the digital signal processor.

Figure 9:
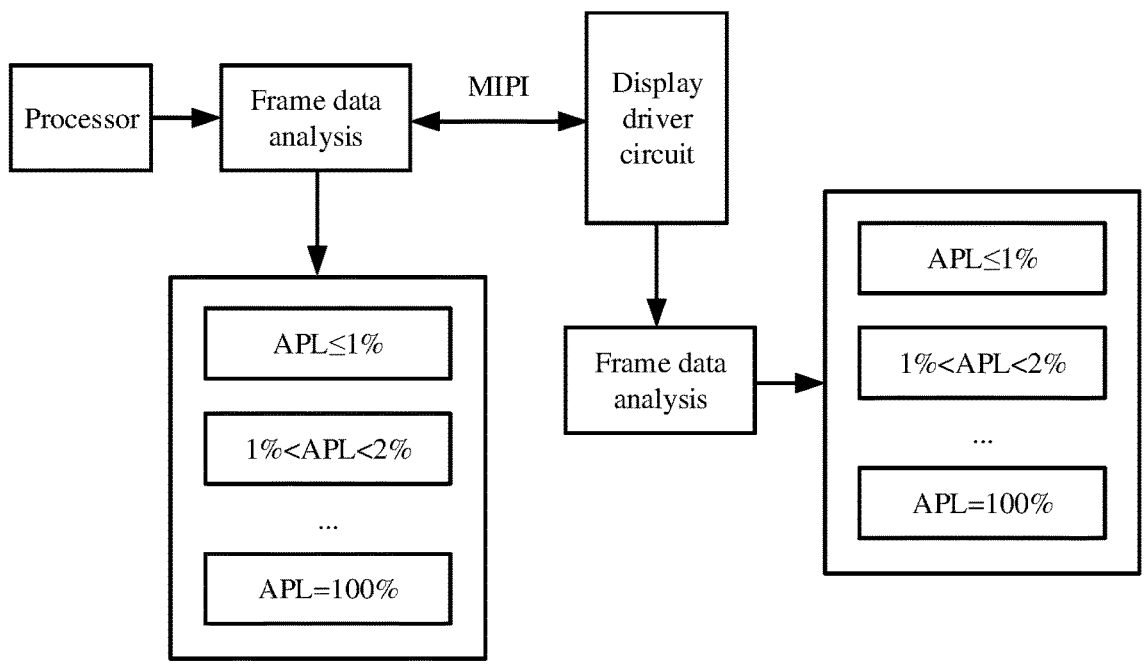
FIG. 9 is a schematic diagram of a partial application environment of a display drive method according to another embodiment of this application.

FIG. 9 is a schematic diagram of an application environment of a display drive method based on frame data according to another embodiment of this application. In a third embodiment of this application, the analysis unit includes the processor and the display driver circuit. The receiving to-be-displayed frame data, and calculating an APL percentage of the frame data by using an analysis unit includes: receiving, by the processor, to-be-displayed frame data; calculating an APL percentage of the frame data; transmitting the frame data to the display driver circuit, and recalculating, by the display driver circuit, an APL percentage of the frame data. It should be noted that the processor calculates an APL percentage of the frame data, to select a corresponding HDR effect curve based on the APL percentage during subsequent HDR processing on the frame data; and the display driver circuit calculates an APL percentage of the frame data, to set a display brightness value corresponding to the APL percentage. In this case, the processor does not need to transmit the APL percentage of the frame data to the display driver circuit.

S102: Perform HDR processing on the frame data based on the APL percentage of the frame data, and transmit the frame data obtained through HDR processing to the display driver circuit.

Figure 10:
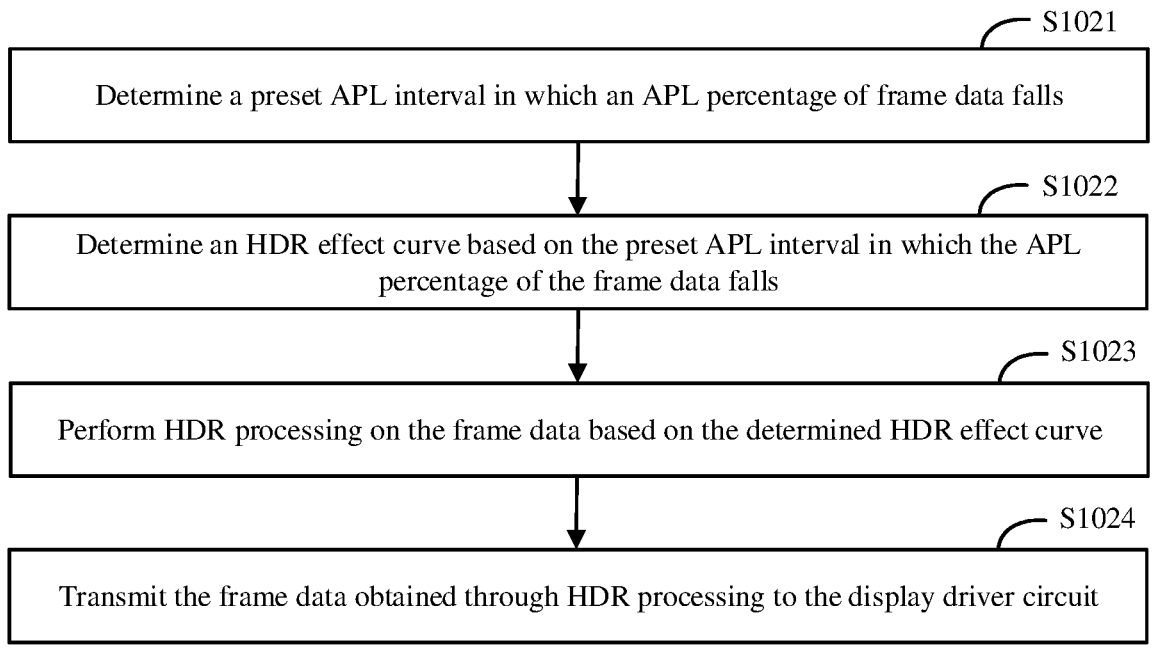
FIG. 10 is a flowchart of performing HDR processing on frame data based on an APL percentage of the frame data, and transmitting the frame data obtained through HDR processing to a display driver circuit according to an embodiment of this application.

In an embodiment of this application, the application layer performs HDR processing on the frame data based on the APL percentage of the frame data, and the framework layer transmits the frame data obtained through HDR processing to the display driver circuit. For a detailed procedure, refer to FIG. 10, specifically including the following steps:

S1021: Determine an APL interval in which the APL percentage of the frame data falls.

In an embodiment of this application, a plurality of APL intervals are preset in the electronic device. For example, a first APL interval is 0<APL≤1%, a second APL interval is 1%<APL<2%, a third APL interval is 2%≤APL<3%, and so on, until an APL interval is APL=100%. It should be noted that a manner of dividing the APL intervals is not limited thereto, and only needs to be adapted to a specification of the display of the electronic device. For example, every 2% may be alternatively used as a spacing between APL intervals.

In an embodiment of this application, the determining an APL interval in which the APL percentage of the frame data falls includes: determining an APL interval in which the APL percentage of the video frame or the image falls. For example, if the APL percentage of the video frame or the image obtained through calculation is 1%, it is determined that the APL percentage of the video frame or the image falls in the first APL interval.

S1022: Determine an HDR effect curve based on the APL interval in which the APL percentage of the frame data falls.

Figure 11:
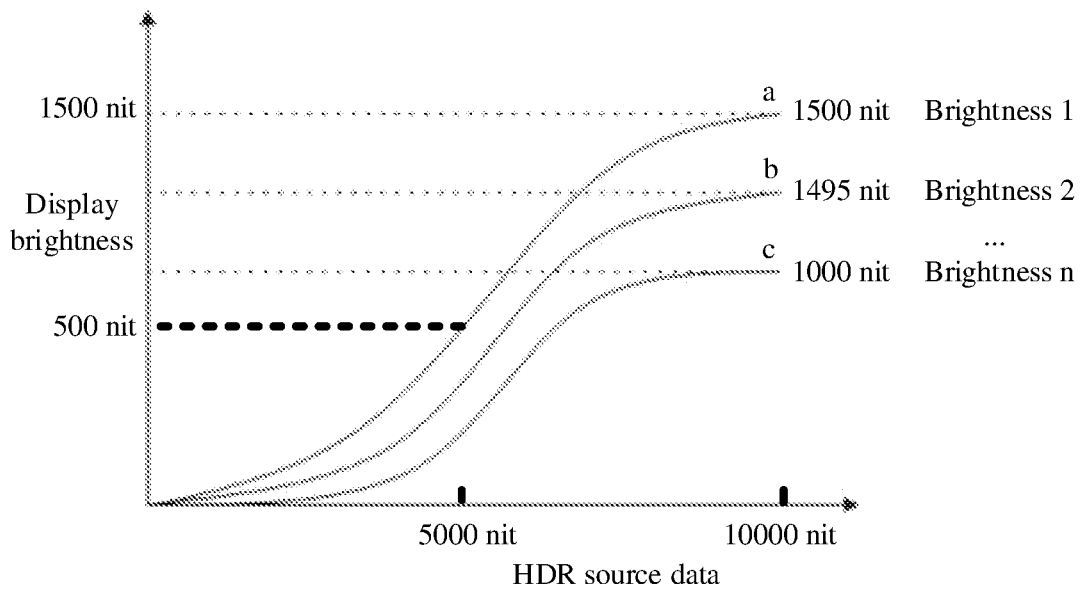
FIG. 11 is a schematic diagram of a plurality of HDR effect curves according to an embodiment of this application.

FIG. 11 is a schematic diagram of a plurality of HDR effect curves according to an embodiment of this application. In an embodiment of this application, a plurality of HDR effect curves are preset in the electronic device, where each HDR effect curve corresponds to threshold brightness of a display. The x-axis of the HDR effect curve is HDR source data, where the HDR source data is initial brightness of a pixel in the frame data, and the y-axis is brightness of the display. A correspondence between an APL interval and threshold brightness of the display or a correspondence between an APL percentage and threshold brightness of the display is preset in the electronic device. It should be noted that the correspondence between the APL interval and the threshold brightness is set by the electronic device before delivery, and threshold brightness corresponding to an APL interval is maximum display brightness that the display can reach when the frame data is displayed on the display. The maximum display brightness is determined by a hardware specification of the display of the electronic device.

In an embodiment of this application, the determining an HDR effect curve based on the APL interval in which the APL percentage of the frame data falls includes: determining, based on the APL interval in which the APL percentage of the frame data falls and the correspondence between the preset APL interval and the threshold brightness of the display, threshold brightness corresponding to the APL interval, and determining, from the plurality of preset HDR effect curves, an HDR effect curve corresponding to the threshold brightness. For example, if the APL interval in which the APL percentage of the frame data falls is the first APL interval, corresponding threshold brightness is first threshold brightness 1500 nit, and an HDR effect curve corresponding to the first APL interval is a curve a in FIG. 11; or if the APL interval in which the APL percentage of the frame data falls is the second APL interval, corresponding threshold brightness is second threshold brightness 1495 nit, and an HDR effect curve corresponding to the second APL interval is a curve b in FIG. 11.

S1023: Perform HDR processing on the frame data based on the determined HDR effect curve.

In an embodiment of this application, the HDR effect curve is a PQ (Perceptual Quantization, perceptual quantization) curve. The performing HDR processing on the frame data based on the determined HDR effect curve includes: performing tone mapping processing on the frame data based on the determined HDR effect curve, and mapping grayscale data in the frame data to to-be-displayed grayscale data.

In an embodiment of this application, the grayscale data of the frame data includes brightness and a tone. Specifically, the mapping grayscale data in the frame data to to-be-displayed grayscale data includes: respectively mapping, based on the determined HDR effect curve, initial brightness and an initial tone of each pixel in the video frame or the image to display brightness and a display tone within a display brightness range of the display. For example, as shown in FIG. 11, based on the HDR effect curve, the highest initial brightness 10000 nit of a pixel may be mapped to the first threshold brightness 1500 nit of the display, and initial brightness 5000 nit of a pixel may be mapped to display brightness 500 nit of the display.

It should be noted that the PQ curve may map a relatively large brightness range (for example, 0-10000 nit) of the HDR source data to a brightness range (for example, 0-1500 nit) that can be displayed on the display. Alternatively, contrast can be improved based on a curve characteristic (for example, an S-shape curve).

S1024: Transmit the frame data obtained through HDR processing to the display driver circuit.

In an embodiment of this application, the transmitting the frame data obtained through HDR processing to the display driver circuit includes: transmitting the frame data obtained through HDR processing to the display driver circuit by using an MIPI (Mobile Industry Processor Interface, mobile industry processor interface).

S103: The display driver circuit drives, based on the APL percentage of the frame data, the display to display the frame data obtained through HDR processing.

Figure 12:
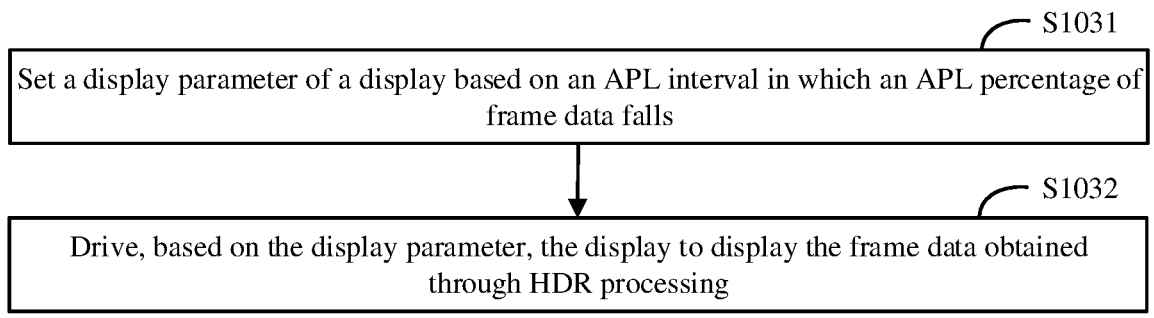
FIG. 12 is a flowchart of driving, by a display driver circuit based on an APL percentage of frame data, a display to display the frame data obtained through HDR processing according to an embodiment of this application.

In an embodiment of this application, the display driver circuit drives, based on the APL percentage of the frame data, the display to display the frame data obtained through HDR processing, which is performed by the kernel layer. For a detailed procedure, refer to FIG. 12, specifically including the following steps:

S1031: Set a display parameter of the display based on the APL interval in which the APL percentage of the frame data falls.

In an embodiment of this application, the display parameter includes, but is not limited to, a DBV (Display Brightness Value, display brightness value) threshold and grayscale data of a pixel. The DBV is a brightness set value of the display, and the grayscale data of the pixel includes display brightness and a display tone of a pixel.

In an embodiment of this application, a correspondence between the APL interval and the DBV threshold is preset in the electronic device. The setting a display parameter of the display based on the APL interval in which the APL percentage of the frame data falls includes: determining, based on the correspondence between the APL interval and the DBV threshold, a DBV threshold corresponding to the APL interval in which the APL percentage of the frame data falls; setting, by the display driver circuit, the DBV threshold on the display; obtaining the grayscale data of each pixel in the frame data obtained through tone mapping processing; and setting to-be-displayed grayscale data of each pixel in the frame data to the grayscale data obtained through tone mapping processing. The DBV threshold is a maximum DBV of the display within the APL interval. A DBV threshold corresponding to APL 1% is $N_1$, for example, $N_1$ is peak brightness 1500 nit. A DBV threshold corresponding to APL 1.5% is $N_2$, for example, $N_2$ is a brightness value 1495 nit.

In an embodiment of this application, a DBV obtained through mapping of a pixel with the highest initial brightness is the DBV threshold. For example, a pixel in a white area necessarily has the highest initial brightness, and therefore a DBV of the pixel in the white area is 1500 nit.

In another embodiment, the display parameter further includes a local Gamma value of the frame data obtained through HDR processing. In a process of performing tone mapping processing on the frame data based on the determined HDR effect curve, the grayscale data of each pixel in the frame data is mapped to the to-be-displayed grayscale data, and a Gamma value of a local pixel in the frame data is mapped to a to-be-displayed local Gamma value. The setting a display parameter of the display based on the APL interval in which the APL percentage of the frame data falls includes: determining, based on the correspondence between the APL interval and the DBV threshold, a DBV threshold corresponding to the APL interval in which the APL percentage of the frame data falls; setting, by the display driver circuit, the DBV threshold on the display; and obtaining the grayscale data and the local Gamma value of each pixel in the frame data obtained through tone mapping processing.

S1032: Drive, based on the display parameter, the display to display the frame data obtained through HDR processing.

In an embodiment of this application, the driving, based on the display parameter, the display to display the frame data obtained through HDR processing includes: driving, by the display driver circuit, the display to display, by using the set DBV threshold, the frame data obtained through HDR processing, so that the grayscale data of each pixel in the video frame or the image displayed on the display reaches set to-be-displayed grayscale data, that is, so that brightness and a tone of each pixel in the video frame or the image actually displayed on the display reaches brightness and a tone obtained through HDR processing, and a pixel area (for example, a white area) with the highest initial brightness in the frame data is displayed with the peak brightness (1500 nit).

In another embodiment, the driving, based on the display parameter, the display to display the frame data obtained through HDR processing includes: driving, by the display driver circuit, the display at the DBV threshold to display the frame data obtained through HDR processing, so that the grayscale data of each pixel in the video frame or the image displayed on the display reaches the set to-be-displayed grayscale data; and performing local Gamma correction on the displayed frame data based on the local Gamma value.

Figure 13:
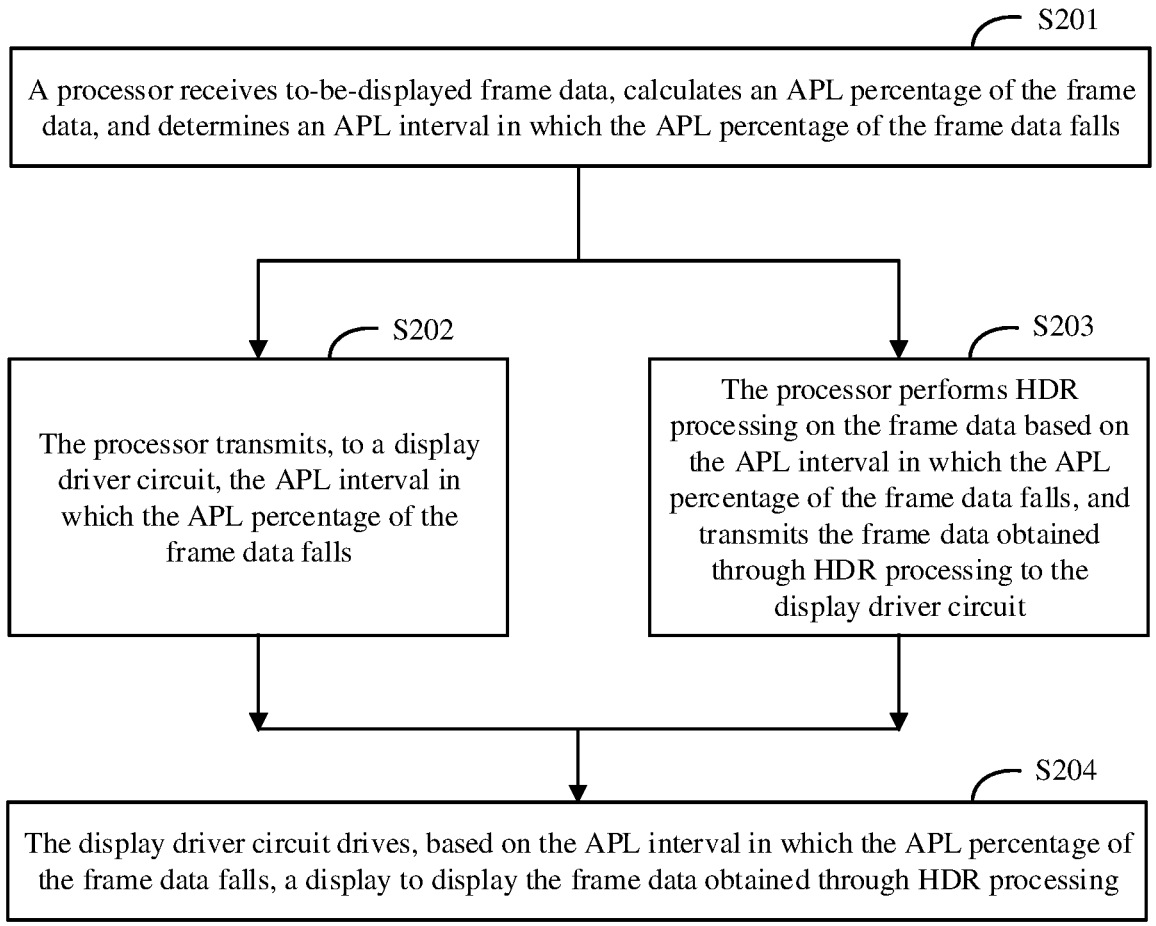
FIG. 13 is a flowchart of a display drive method based on frame data according to another embodiment of this application.

As shown in FIG. 5, in the first embodiment of this application, the analysis unit is the processor. FIG. 13 is a flowchart of a display drive method based on frame data according to a first embodiment of this application. The method specifically includes the following steps:

S201: The processor receives to-be-displayed frame data, calculates an APL percentage of the frame data, and determines an APL interval in which the APL percentage of the frame data falls.

S202: The processor transmits, to a display driver circuit, the APL interval in which the APL percentage of the frame data falls.

Figure 14:
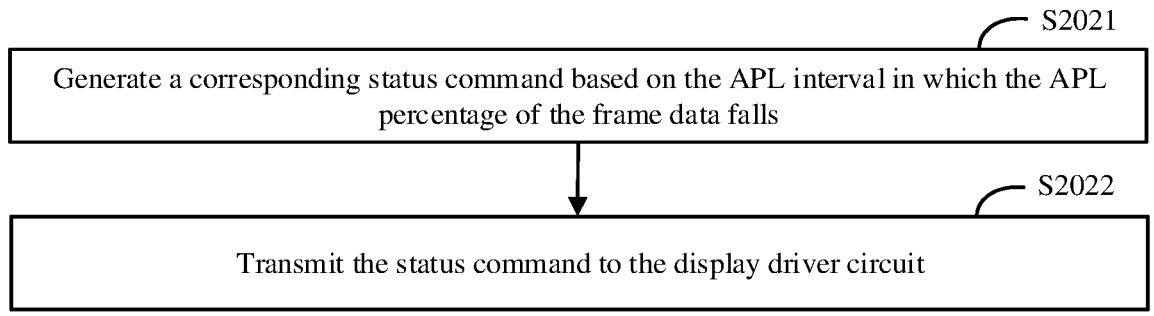
FIG. 14 is a flowchart of transmitting, to a display driver circuit, an APL interval in which an APL percentage of frame data falls according to an embodiment of this application.

In an embodiment of this application, for a detailed procedure in which the processor transmits, to a display driver circuit, the APL interval in which the APL percentage of the frame data falls, refer to FIG. 14, specifically including the following steps:

S2021: Generate a corresponding status command based on APL interval information in which the APL percentage of the frame data falls.

As shown in FIG. 6, in an embodiment of this application, the generating a corresponding status command based on APL interval information in which the APL percentage of the frame data falls includes: recording, in a CMD (command), the APL interval information in which the APL percentage of the frame data falls, and using the CMD command recording interval information or interval identification of the APL interval as a status command corresponding to the APL interval.

Figure 15:
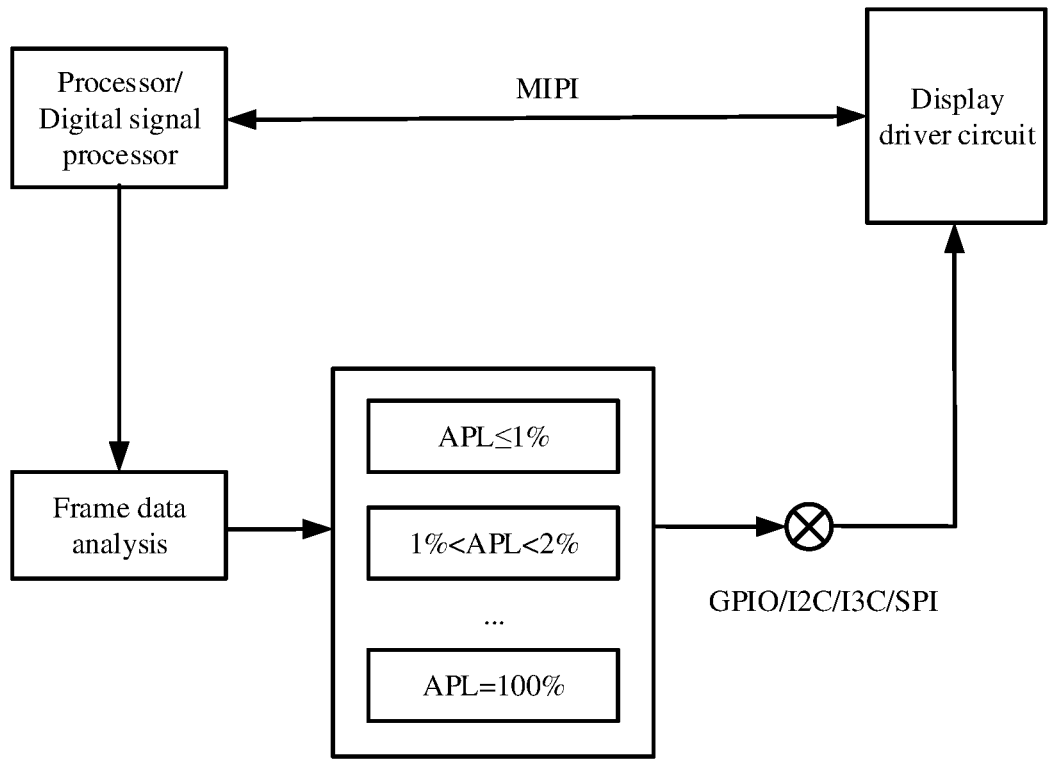
FIG. 15 is a schematic diagram of an application environment of transmitting, to a display driver circuit, an APL interval in which an APL percentage of frame data falls according to an embodiment of this application.

As shown in FIG. 15, in another embodiment of this application, the generating a corresponding status command based on the APL interval information in which the APL percentage of the frame data falls includes: determining a quantity of pulses based on the APL interval information in which the APL percentage of the frame data falls; generating, based on the quantity of pulses, a PWM (Pulse Width Modulation, pulse width modulation) signal by using a GPIO (General-Purpose Input/Output, general-purpose input/output) interface; and using the PWM signal as a status command corresponding to the APL interval. For example, if the APL interval in which the APL percentage of the frame data falls is the first APL interval, it is determined that the quantity of pulses is two, or if the APL interval in which the APL percentage of the frame data falls is the second APL interval, it is determined that the quantity of pulses is four, and so on.

S2022: Transmit the status command to the display driver circuit.

As shown in FIG. 6, in an embodiment of this application, the transmitting the status command to the display driver circuit includes: transmitting, to the display driver circuit by using the MIPI, the status command together with a frame data stream in a preset time sequence.

Figure 16:
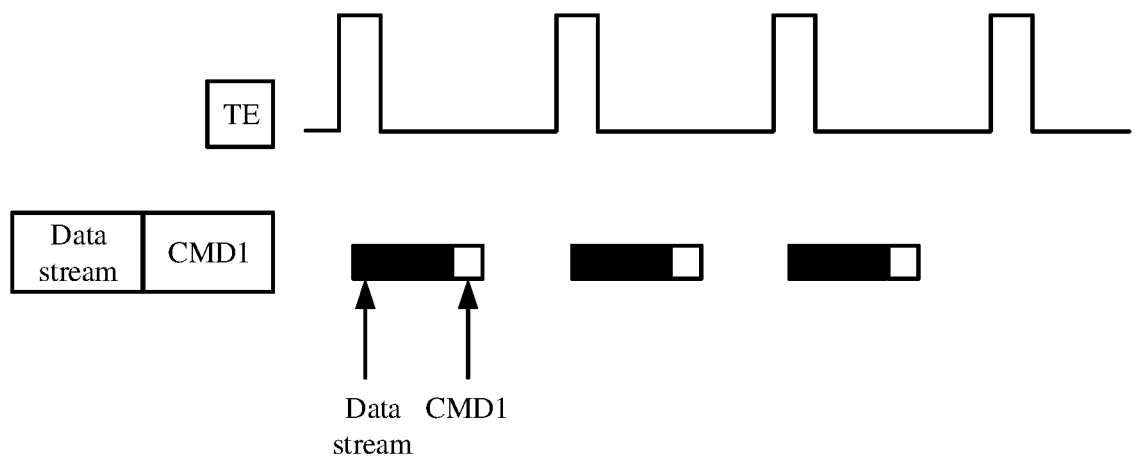
FIG. 16 is a schematic diagram of a transmission time sequence of a status command and a frame data stream according to an embodiment of this application.

FIG. 16 is a schematic diagram of a transmission time sequence of a status command and a frame data stream according to an embodiment of this application. In an embodiment of this application, the status command corresponding to the APL interval in which the APL percentage of each video frame or each image falls is placed at an end location of to-be-transmitted video frame data or image data. The video frame data or the image data including the status command forms a data stream in a time sequence, then the video frame data or the image data including the status command is transmitted to the display driver circuit in a time sequence, and it is determined whether a feedback signal of the display driver circuit is received. If it is determined that the feedback signal of the display driver circuit is received, next video frame data or next image data including a status command in the data stream is transmitted in a time sequence; or if it is determined that no feedback signal of the display driver circuit is received, transmission of the video frame data or the image data in the data stream is suspended.

Figure 17:
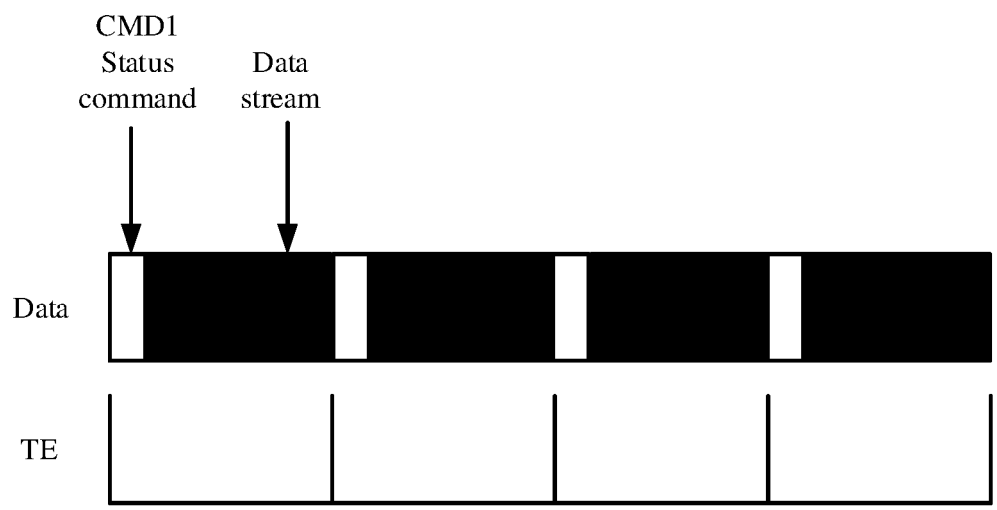
FIG. 17 is a schematic diagram of a transmission time sequence of a status command and a frame data stream according to another embodiment of this application.

FIG. 17 is a schematic diagram of a transmission time sequence of a status command and a frame data stream according to another embodiment of this application. In another embodiment, the status command corresponding to the APL interval in which the APL percentage of each video frame or each image falls may be alternatively placed at a start location of to-be-transmitted video frame data or image data. The status command is used as a header, the video frame data or the image data including the status command forms a data stream in a time sequence, then the video frame data or the image data including the status command is transmitted to the display driver circuit in a time sequence, and it is determined whether a feedback signal of the display driver circuit is received. If it is determined that the feedback signal of the display driver circuit is received, next video frame data or next image data including a status command in the data stream is transmitted in a time sequence; or if it is determined that no feedback signal of the display driver circuit is received, transmission of the video frame data or the image data in the data stream is suspended.

In an embodiment of this application, the feedback signal is a TE (Tearing Effect) signal, and is output by a TE pin of the display driver circuit. The video frame data or the image data continues to be transmitted after the TE signal of the display driver circuit is received, to prevent a TE (tearing) phenomenon of the display. It should be noted that, a reason for the TE phenomenon is that a refresh speed (that is, a speed of displaying frame data) of the display is lower than a speed of writing frame data, resulting in cross read/write of the frame data. A speed of transmitting the frame data to the display driver circuit is reduced, so that the speed of writing the frame data is lower than the refresh speed of the display, and therefore the TE phenomenon does not occur on the display.

As shown in FIG. 15, in an embodiment of this application, the transmitting the status command to the display driver circuit includes: transmitting, to the display driver circuit, the status command as the PWM signal by using the GPIO interface. It should be noted that the GPIO interface directly transmits, to the display driver circuit, the PWM signal generated based on the quantity of pulses, and the status command does not need to be transmitted, to the display driver circuit by using the MIPI, together with the frame data stream.

In another embodiment, the transmitting the status command to the display driver circuit may alternatively include: transmitting the status command to the display driver circuit by using an I2C (Inter-Integrated Circuit, serial transmission bus), an I3C (Improved Inter Integrated Circuit, improved serial transmission bus), or an SPI (Serial Peripheral Interface, serial peripheral interface). In this case, the status command does not need to be transmitted, to the display driver circuit by using the MIPI, together with the frame data stream.

S203: The processor performs HDR processing on the frame data based on the APL interval in which the APL percentage of the frame data falls, and transmits the frame data obtained through HDR processing to the display driver circuit.

Figure 18:
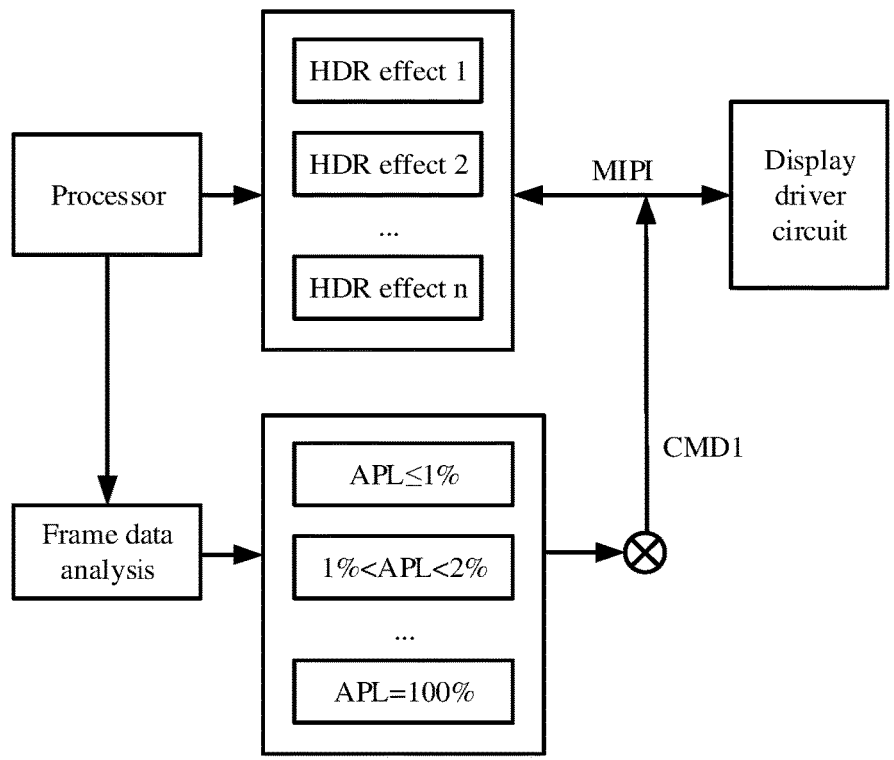
FIG. 18 is a schematic diagram of a partial application environment of a display drive method according to another embodiment of this application.

As shown in FIG. 18, in an embodiment of this application, the processor transmits, to the display driver circuit by using the MIPI, the frame data (for example, an HDR effect 1, an HDR effect 2, . . . , an HDR effect n in FIG. 18) obtained through HDR processing together with the status command.

S204: The display driver circuit drives, based on the APL interval in which the APL percentage of the frame data falls, the display to display the frame data obtained through HDR processing.

In an embodiment of this application, the driving, by the display driver circuit based on the APL interval in which the APL percentage of the frame data falls, the display to display the frame data obtained through HDR processing includes: parsing, by the display driver circuit, a status command corresponding to the frame data, to obtain an APL interval in which the APL percentage of the frame data falls. Specifically, the display driver circuit parses out a status command from the received frame data, then parses the status command to obtain APL interval information, and determines, based on the APL interval information, an APL interval in which the APL percentage of the frame data falls.

In another embodiment, the display driver circuit may alternatively parse a quantity of pulses in the received PWM signal sent by the GPIO interface, and obtain, based on the quantity of pulses, an APL interval in which the APL percentage of the frame data falls.

Figure 19:
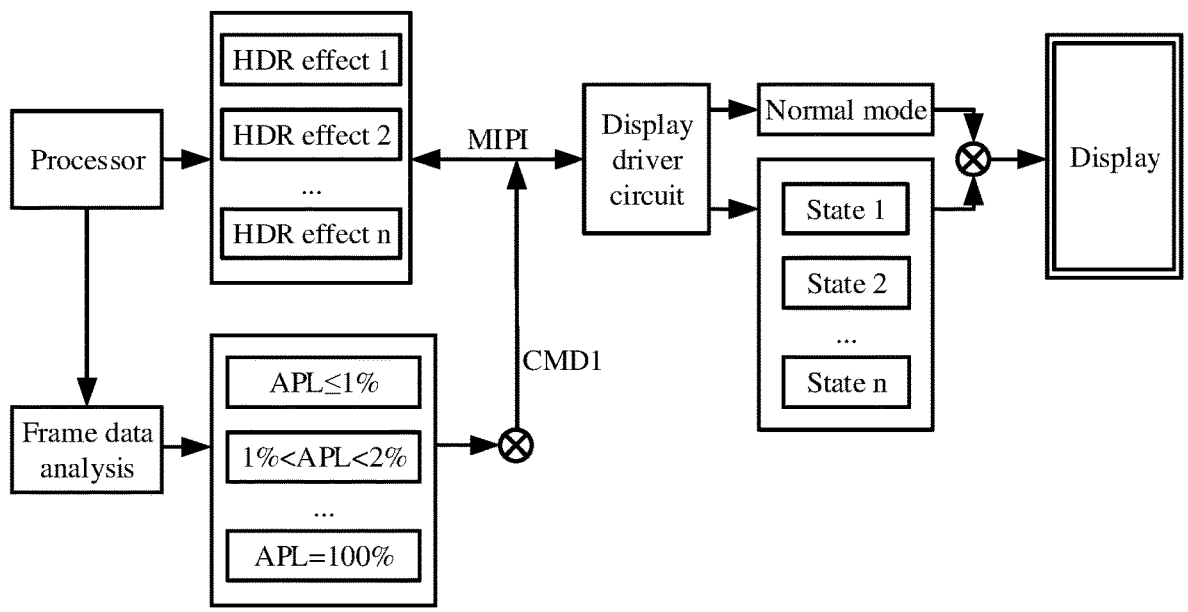
FIG. 19 is a schematic diagram of an application environment of a display drive method according to another embodiment of this application.

As shown in FIG. 19, in an embodiment of this application, the driving, by the display driver circuit based on the APL interval in which the APL percentage of the frame data falls, the display to display the frame data obtained through HDR processing further includes: using, by the display driver circuit, the frame data that is obtained through HDR processing and that is transmitted by the processor and a set DBV threshold as a drive state (for example, a state 1, a state 2, and a state n in FIG. 19); and driving the display to display, by using the DBV threshold, the video frame or the image obtained through HDR processing, so that brightness and a tone of each pixel of the video frame or the image displayed on the display reach brightness and a tone of to-be-displayed grayscale data, and a pixel area (for example, a white area) with the highest initial brightness in the frame data is displayed with peak brightness.

Figure 20:
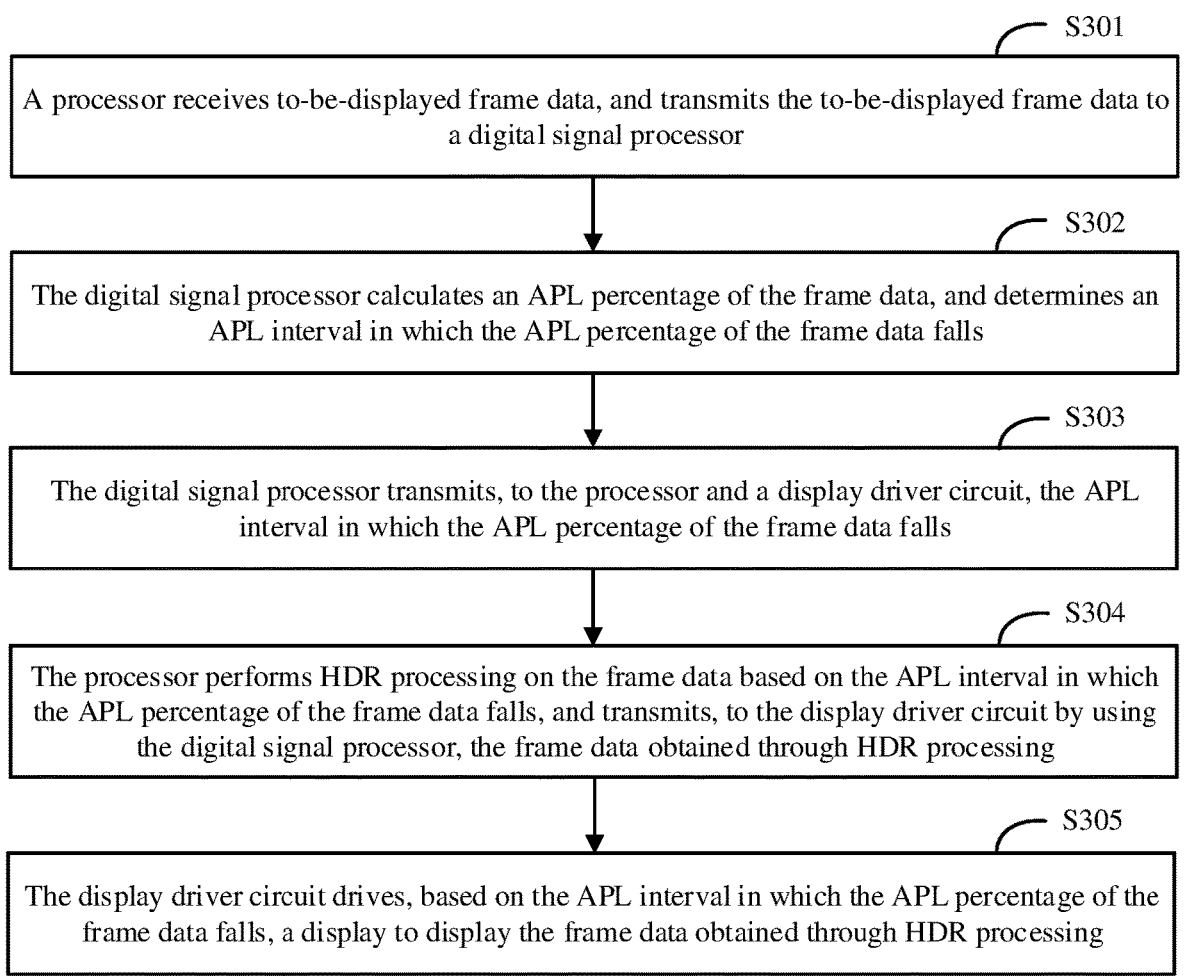
FIG. 20 is a flowchart of a display drive method based on frame data according to another embodiment of this application.

As shown in FIG. 7, in the second embodiment of this application, the analysis unit is the digital signal processor. FIG. 20 is a flowchart of a display drive method based on frame data according to a second embodiment of this application. The method specifically includes the following steps:

S301: The processor receives to-be-displayed frame data, and transmits the to-be-displayed frame data to the digital signal processor.

S302: The digital signal processor calculates an APL percentage of the frame data, and determines an APL interval in which the APL percentage of the frame data falls.

S303: The digital signal processor transmits, to the processor and the display driver circuit, the APL interval in which the APL percentage of the frame data falls.

As shown in FIG. 8 and FIG. 15, in an embodiment of this application, a manner in which the digital signal processor transmits, to the display driver circuit, the APL interval in which the APL percentage of the frame data falls is the same as the manner in which the processor transmits, to the display driver circuit, the APL interval in which the APL percentage of the frame data falls. Details are not described herein again. The digital signal processor transmits, to the processor by using the MIPI, the APL interval in which the APL percentage of the frame data falls.

S304: The processor performs HDR processing on the frame data based on the APL interval in which the APL percentage of the frame data falls, and transmits, to the display driver circuit by using the digital signal processor, the frame data obtained through HDR processing.

Figure 21:
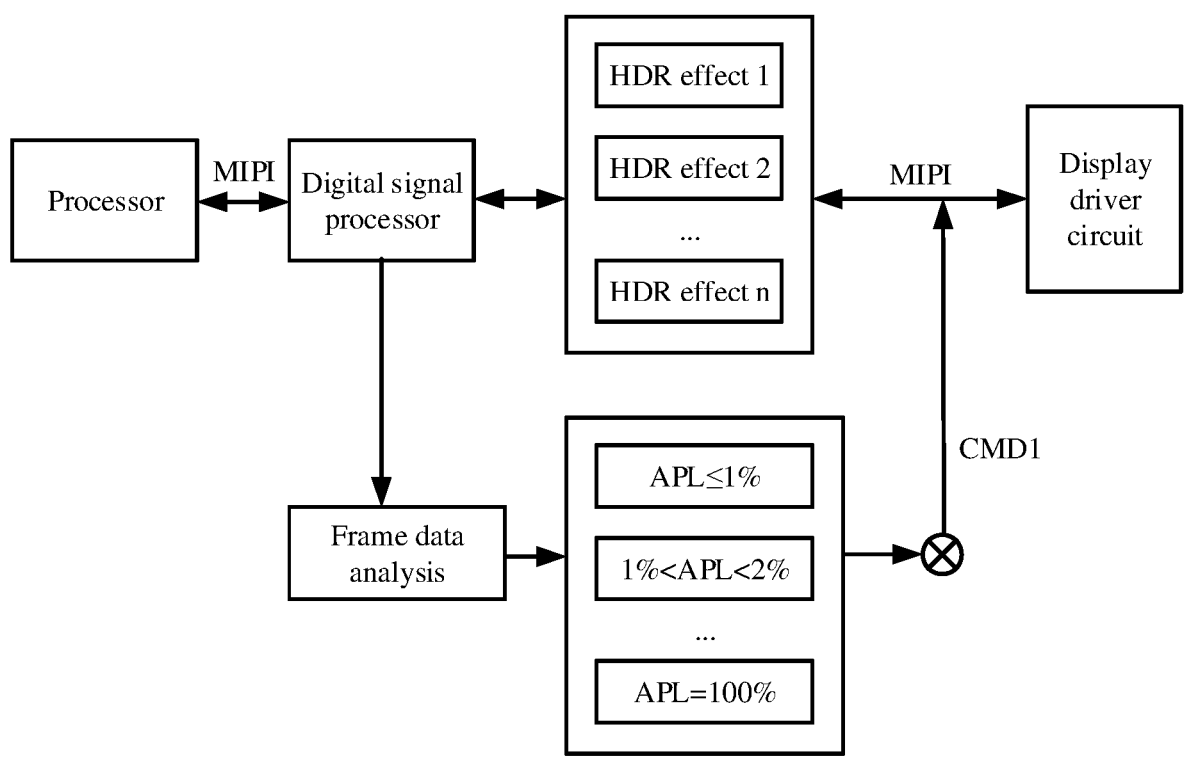
FIG. 21 is a schematic diagram of a partial application environment of a display drive method according to another embodiment of this application.

As shown in FIG. 21, in an embodiment of this application, the processor transmits, to the digital signal processor by using the MIPI, the frame data obtained through HDR processing, and the digital signal processor transmits, to the display driver circuit by using the MIPI, the frame data (for example, an HDR effect 1, an HDR effect 2, . . . , an HDR effect n in FIG. 21) obtained through HDR processing together with the status command.

S305: The display driver circuit drives, based on the APL interval in which the APL percentage of the frame data falls, the display to display the frame data obtained through HDR processing.

In an embodiment of this application, the driving, by the display driver circuit based on the APL interval in which the APL percentage of the frame data falls, the display to display the frame data obtained through HDR processing includes: parsing, by the display driver circuit, a status command corresponding to the frame data, to obtain an APL interval in which the APL percentage of the frame data falls. Specifically, the display driver circuit parses out a status command from the received frame data, then parses the status command to obtain APL interval information, and determines, based on the APL interval information, an APL interval in which the APL percentage of the frame data falls.

In another embodiment, the display driver circuit may alternatively parse a quantity of pulses in the received PWM signal sent by the GPIO interface, and obtain, based on the quantity of pulses, an APL interval in which the APL percentage of the frame data falls.

Figure 22:
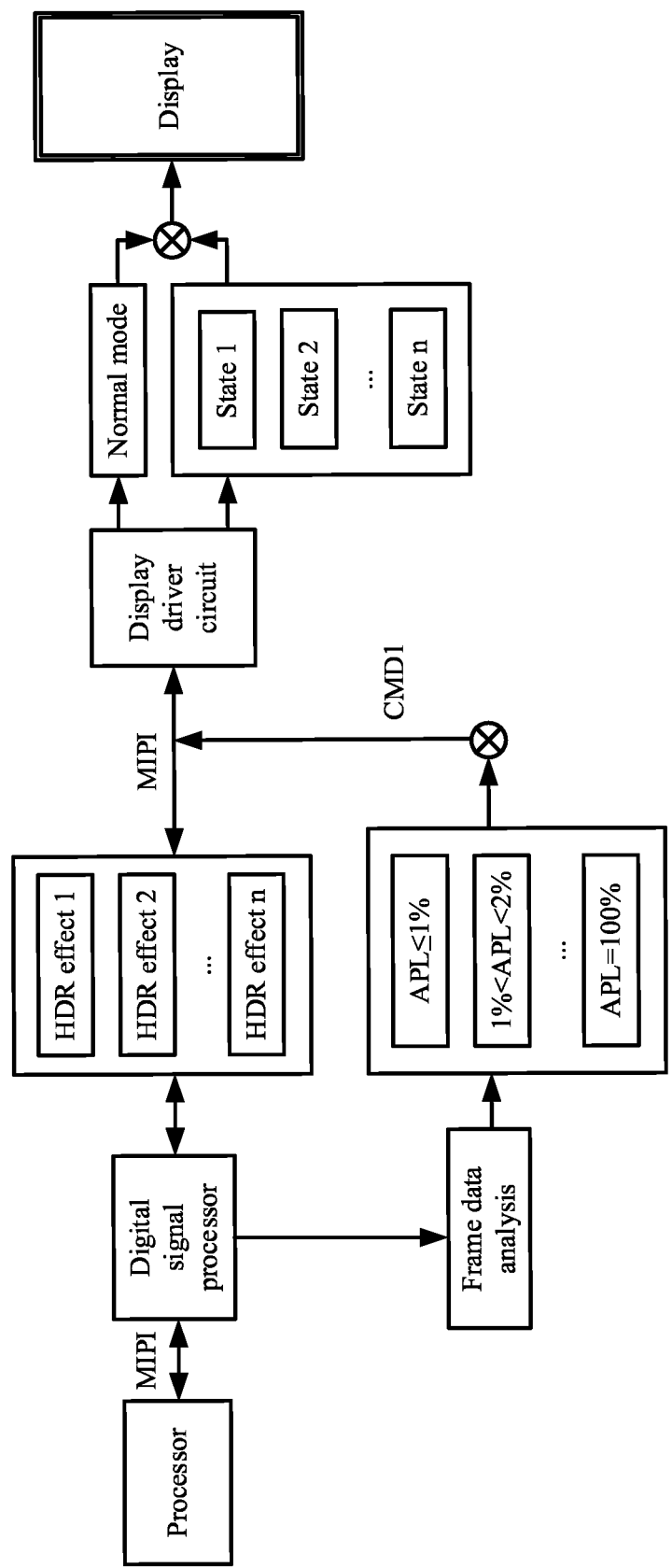
FIG. 22 is a schematic diagram of an application environment of a display drive method according to another embodiment of this application.

As shown in FIG. 22, the display driver circuit uses the frame data that is obtained through HDR processing and that is transmitted by the digital signal processor and a set DBV threshold as a drive state (for example, a state 1, a state 2, and a state n in FIG. 22), and drives the display to display, by using the DBV threshold, the video frame and the image obtained through HDR processing, so that brightness and a tone of each pixel of the video frame or the image displayed on the display reach brightness and a tone of to-be-displayed grayscale data, and a pixel area (for example, a white area) with the highest initial brightness in the frame data is displayed with peak brightness.

Figure 23:
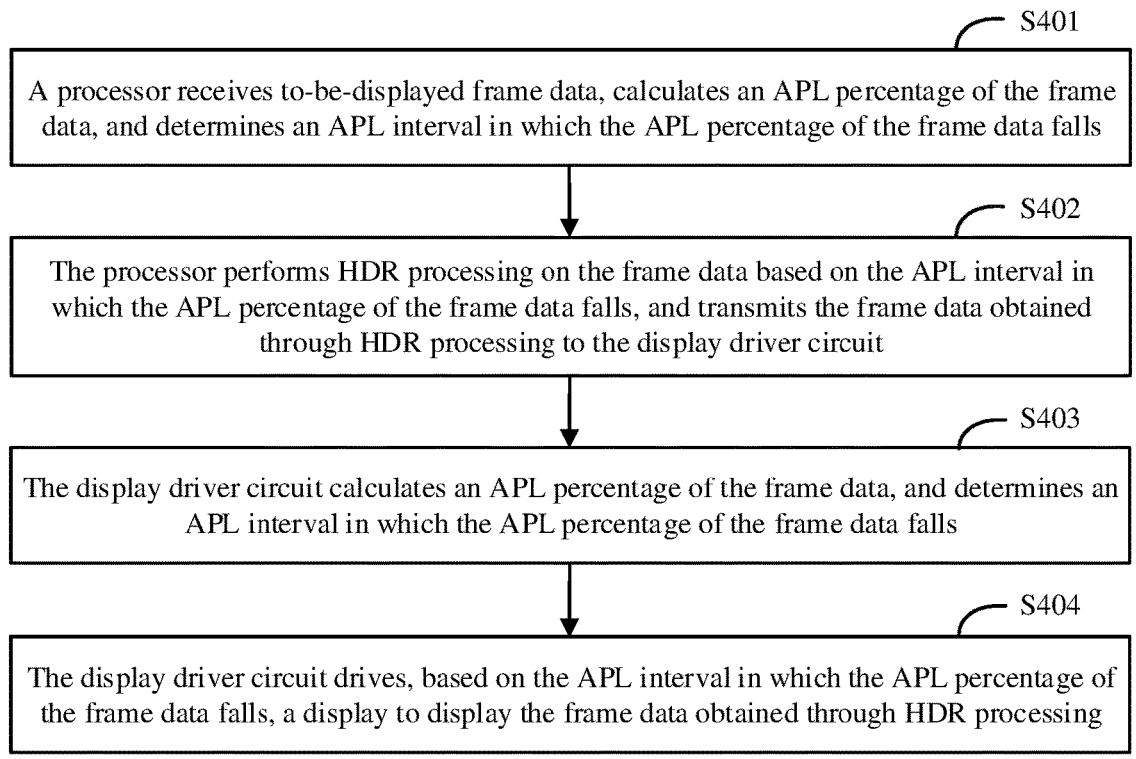
FIG. 23 is a flowchart of a display drive method based on frame data according to another embodiment of this application.

As shown in FIG. 5, in the third embodiment of this application, the analysis unit is the processor and the display driver circuit. FIG. 23 is a flowchart of a display drive method based on frame data according to a third embodiment of this application. The method specifically includes the following steps:

S401: The processor receives to-be-displayed frame data, calculates an APL percentage of the frame data, and determines an APL interval in which the APL percentage of the frame data falls.

S402: The processor performs HDR processing on the frame data based on the APL interval in which the APL percentage of the frame data falls, and transmits the frame data obtained through HDR processing to the display driver circuit.

Figure 24:
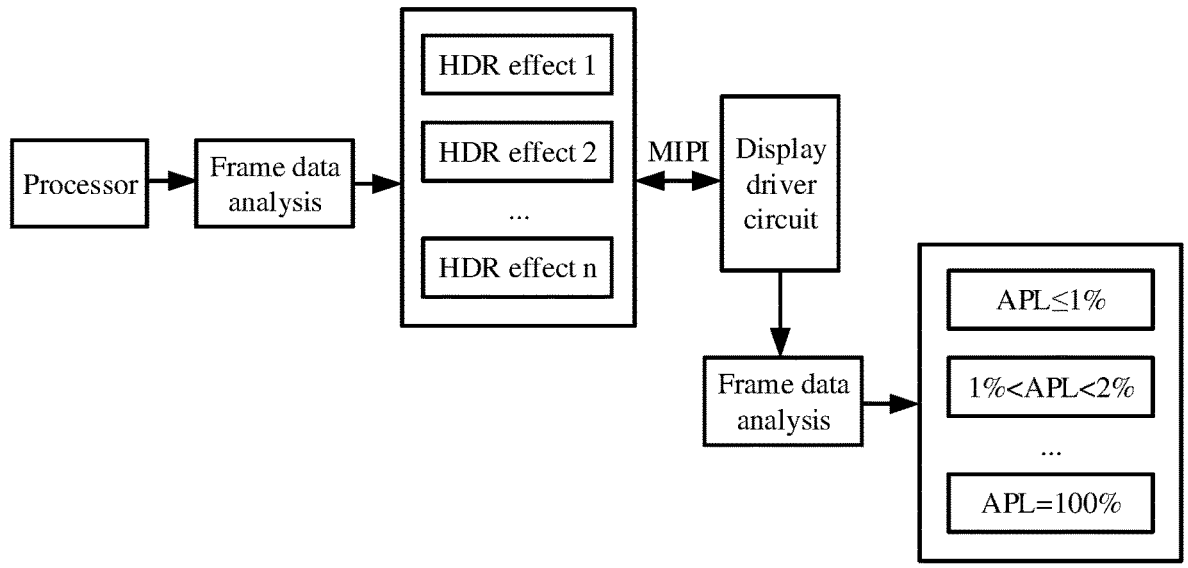
FIG. 24 is a schematic diagram of a partial application environment of a display drive method according to another embodiment of this application.

As shown in FIG. 24, in an embodiment of this application, the processor transmits, to the display driver circuit by using the MIPI, the frame data (for example, an HDR effect 1, an HDR effect 2, . . . , an HDR effect n in FIG. 24) obtained through HDR processing.

S403: The display driver circuit calculates an APL percentage of the frame data, and determines an APL interval in which the APL percentage of the frame data falls.

S404: The display driver circuit drives, based on the APL interval in which the APL percentage of the frame data falls, the display to display the frame data obtained through HDR processing.

Figure 25:
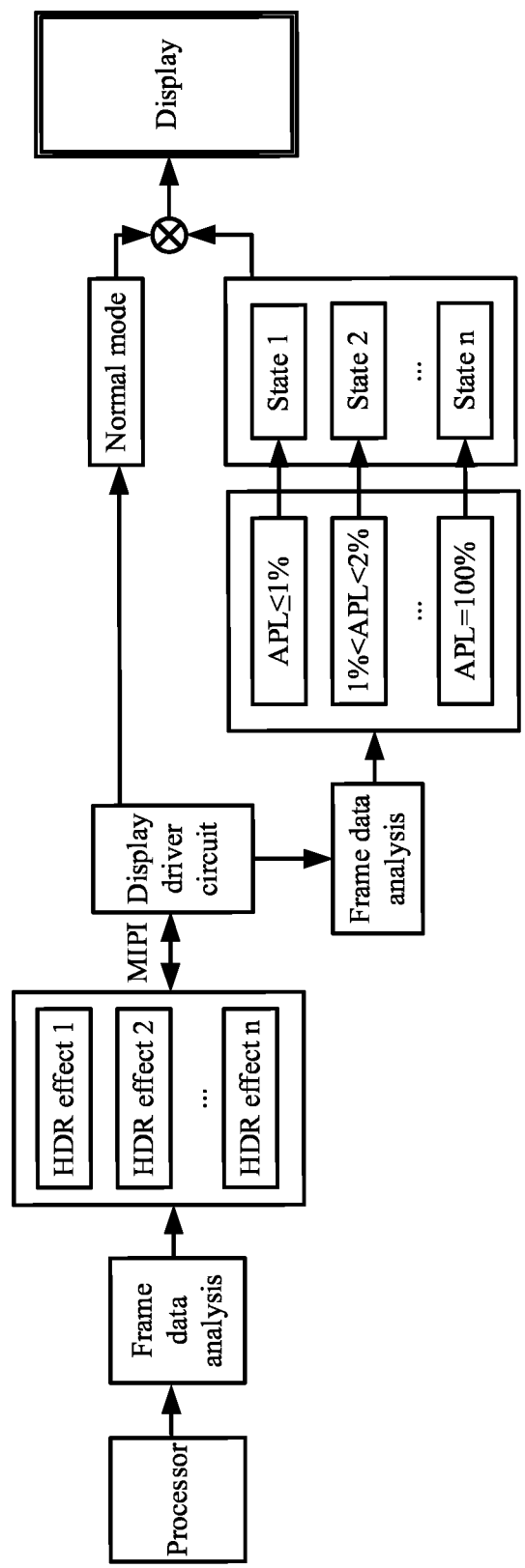
FIG. 25 is a schematic diagram of an application environment of a display drive method according to another embodiment of this application.

As shown in FIG. 25, the display driver circuit uses the frame data that is obtained through HDR processing and that is transmitted by the processor and a DBV threshold set by the APL interval in which the APL percentage that is of the frame data and that is obtained through self-calculation falls as a drive state (for example, a state 1, a state 2, and a state n in FIG. 25), and drives the display to display, by using the DBV threshold, the video frame and the image obtained through HDR processing, so that brightness and a tone of each pixel of the video frame or the image displayed on the display reach brightness and a tone of to-be-displayed grayscale data, and a pixel area (for example, a white area) with the highest initial brightness in the frame data is displayed with peak brightness.

Figure 26:
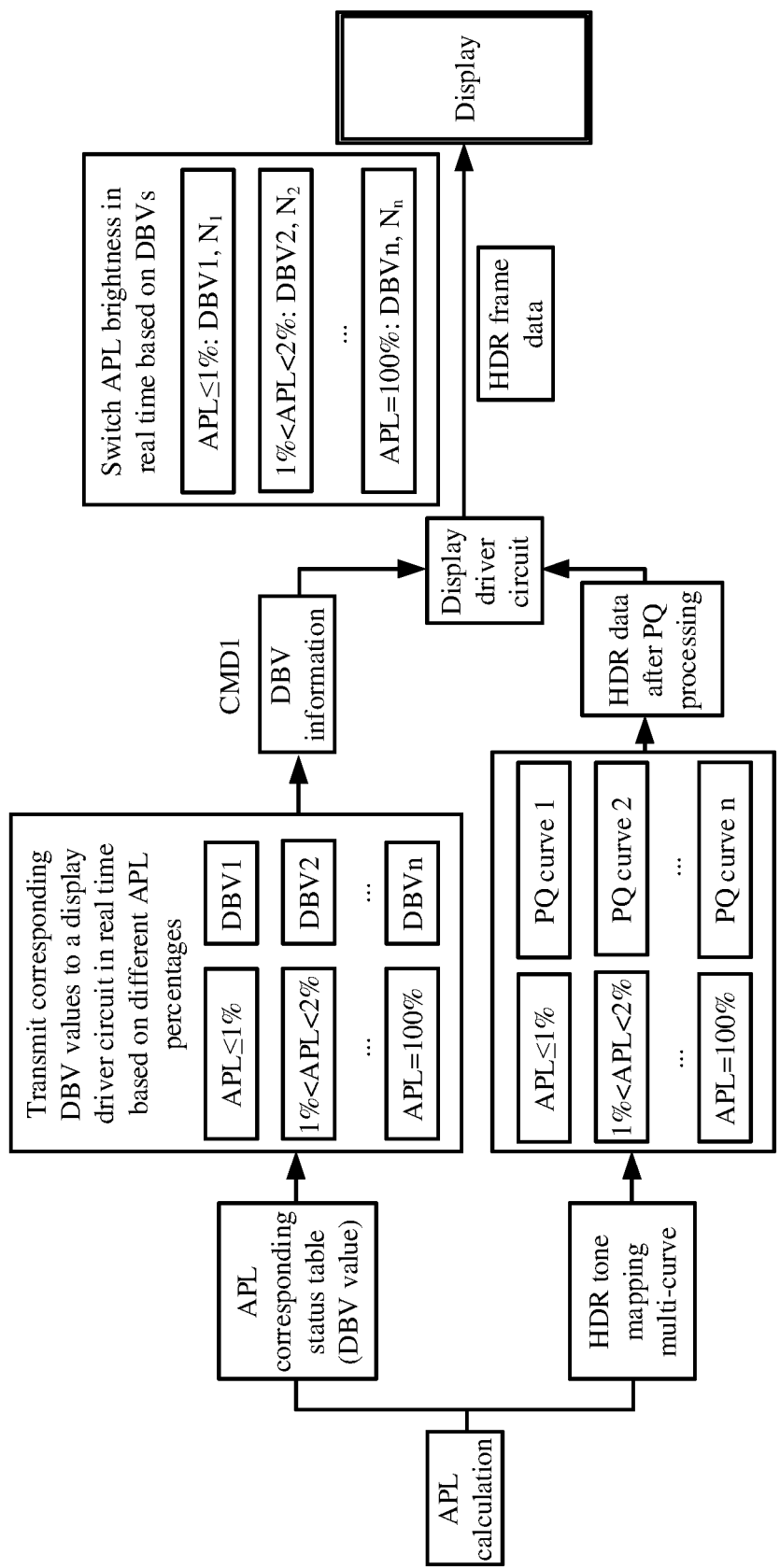
FIG. 26 is a schematic diagram of an application scenario of a display drive method according to an embodiment of this application.

FIG. 26 is a schematic diagram of an application scenario of a display drive method based on frame data according to an embodiment of this application. After calculating the APL percentage of the frame data, the processor or the digital signal processor determines a DBV threshold corresponding to the APL interval in which the APL percentage falls, records the DBV threshold in a status command CMD1, and transmits the DBV threshold to the display driver circuit. The display driver circuit sets the DBV threshold on the display. A DBV threshold corresponding to APL 1% is a peak brightness value $N_1$, for example, $N_1$ is 1500 nit. A DBV threshold corresponding to APL 1.5% is a brightness value $N_2$, for example, $N_2$ is 1495 nit. In addition, the processor determines, from a plurality of curves based on the APL interval in which the APL percentage of the frame data falls, an HDR effect curve corresponding to the APL interval. An HDR effect curve corresponding to the APL 1% is a PQ curve 1, and an HDR effect curve corresponding to the APL 1.5% is a PQ curve 2. The processor maps, by using the determined HDR effect curve, grayscale data of each pixel in the frame data to grayscale data within a brightness range of the display, that is, initial brightness of each pixel is mapped to display brightness within the brightness range of the display, and a tone of each pixel is mapped to a display tone within the brightness range of the display. The display brightness obtained through mapping of the initial brightness of the pixel is less than or equal to the DBV threshold. It should be noted that a DBV obtained through mapping of the highest initial brightness of the pixel is the DBV threshold. For example, the white area necessarily has the highest initial brightness, and a DBV of the white area is peak brightness 1500 nit. The processor transmits, to the display driver circuit, the grayscale data obtained through mapping of each pixel in the frame data together with the frame data and the DBV threshold corresponding to the APL interval in which the APL percentage of the frame data falls. The display driver circuit drives the display to display the frame data by using the DBV threshold as brightness, so that the grayscale data of each pixel in the displayed frame data reaches the grayscale data obtained through mapping.

Figure 27A:
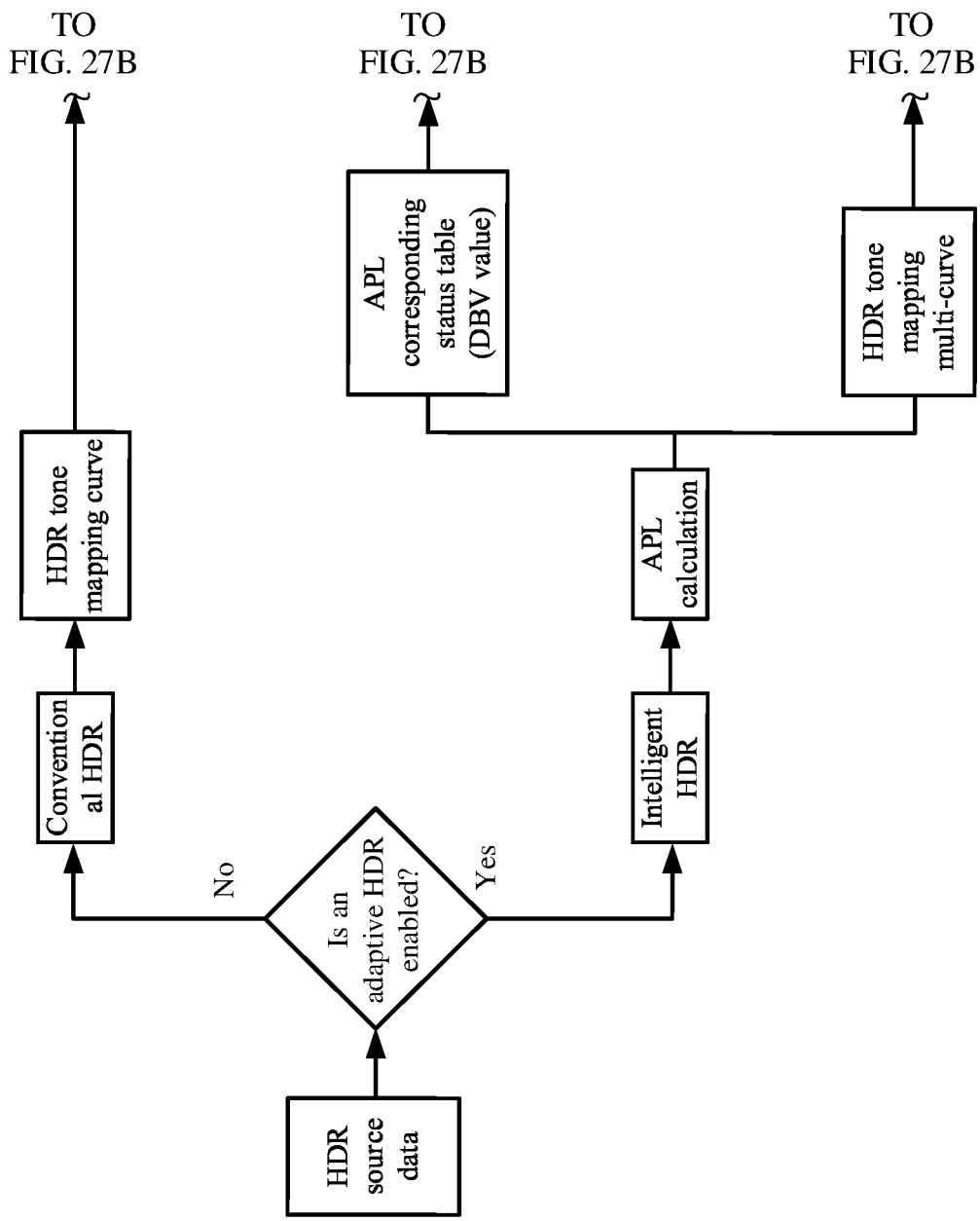
FIG. 27A-FIG. 27B are a schematic diagram of an application scenario of a display drive method according to another embodiment of this application.
Figure 27B:
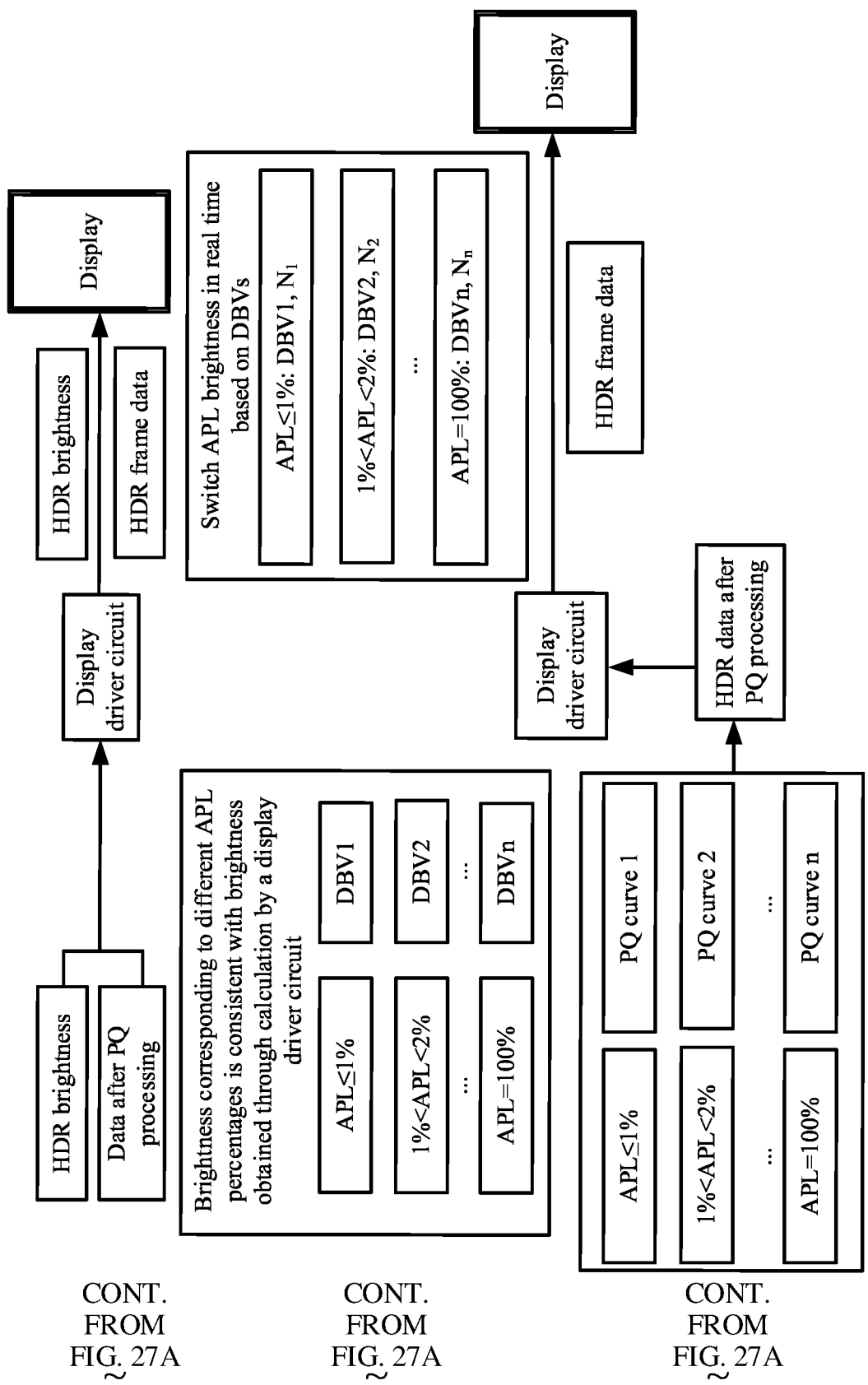

FIG. 27A-FIG. 27B are a schematic diagram of an application scenario of a display drive method based on frame data according to another embodiment of this application. When receiving the to-be-displayed frame data (HDR source data), the processor determines whether an adaptive HDR function is enabled. If it is determined that the adaptive HDR function is enabled, intelligent HDR processing is performed on the frame data, an APL percentage of the frame data is calculated, and an DBV threshold corresponding to an APL interval in which the APL percentage falls is determined. In addition, one HDR effect curve is selected from a plurality of HDR effect curves based on the DBV threshold, and tone mapping processing is performed on the frame data based on the selected HDR effect curve. Grayscale data of each pixel in the frame data is mapped to grayscale data within a brightness range of the display, that is, initial brightness of each pixel is mapped to display brightness within the brightness range of the display, and a tone of each pixel is mapped to a display tone within the brightness range of the display. The brightness obtained through mapping of the initial brightness of the pixel is less than or equal to the DBV threshold. The processor transmits, to the display driver circuit, the frame data including the grayscale data of each pixel. The display driver circuit receives the frame data and the grayscale data of each pixel in the frame data, calculates an APL percentage of the frame data, and determines a DBV threshold of the display based on an APL interval in which the calculated APL percentage falls. The DBV threshold obtained through calculation by the display driver circuit is the same as the DBV threshold determined by the processor. The display driver circuit drives the display to display the frame data by using the DBV threshold as brightness, so that the grayscale data of each pixel in the displayed frame data reaches the grayscale data obtained through mapping. If it is determined that the adaptive HDR function is not enabled, conventional HDR processing is performed on the frame data. Tone mapping processing is performed on the frame data by using a single HDR effect curve, to obtain HDR frame data, and set HDR brightness. The HDR frame data and the HDR brightness is transmitted to the display driver circuit, and the display driver circuit drives the display to display the HDR frame data by using the HDR brightness.

Figure 28:
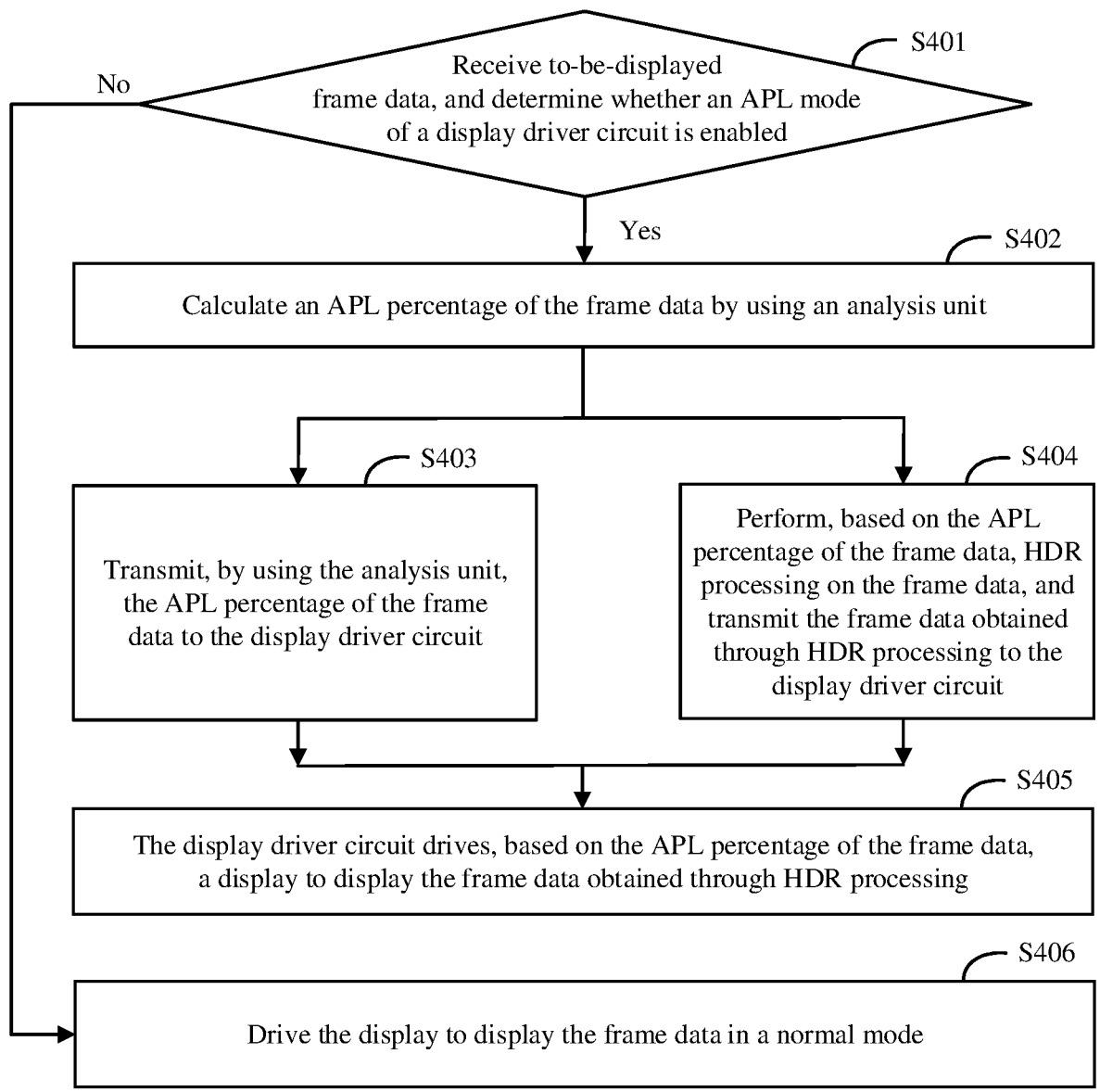
FIG. 28 is a flowchart of a display drive method based on frame data according to another embodiment of this application.

FIG. 28 is a flowchart of a display drive method based on frame data according to another embodiment of this application. The method is applied to the electronic device 100, specifically including the following steps:

S501: Receive to-be-displayed frame data, and determine whether an APL mode of the display driver circuit is enabled.

If it is determined that the APL mode of the display driver circuit is enabled, drive the display to display the frame data in the APL mode. That is, S502: If it is determined that the APL mode of the display driver circuit is enabled, calculate an APL percentage of the frame data by using an analysis unit.

S503: Transmit, to the display driver circuit, the APL percentage of the frame data by using the analysis unit.

S504: Perform HDR processing on the frame data based on the APL percentage of the frame data, and transmit the frame data obtained through HDR processing to the display driver circuit.

S505: The display driver circuit drives, based on the APL percentage of the frame data, the display to display the frame data obtained through HDR processing.

S506: If it is determined that the APL mode of the display driver circuit is not enabled, drive the display to display the frame data in a normal mode.

In an embodiment of this application, the driving the display to display the frame data in a normal mode includes: transmitting to-be-displayed video frame or image to the display driver circuit, and driving, by the display driver circuit, the display to display the video frame or the image by using preset display brightness.

Figure 29:
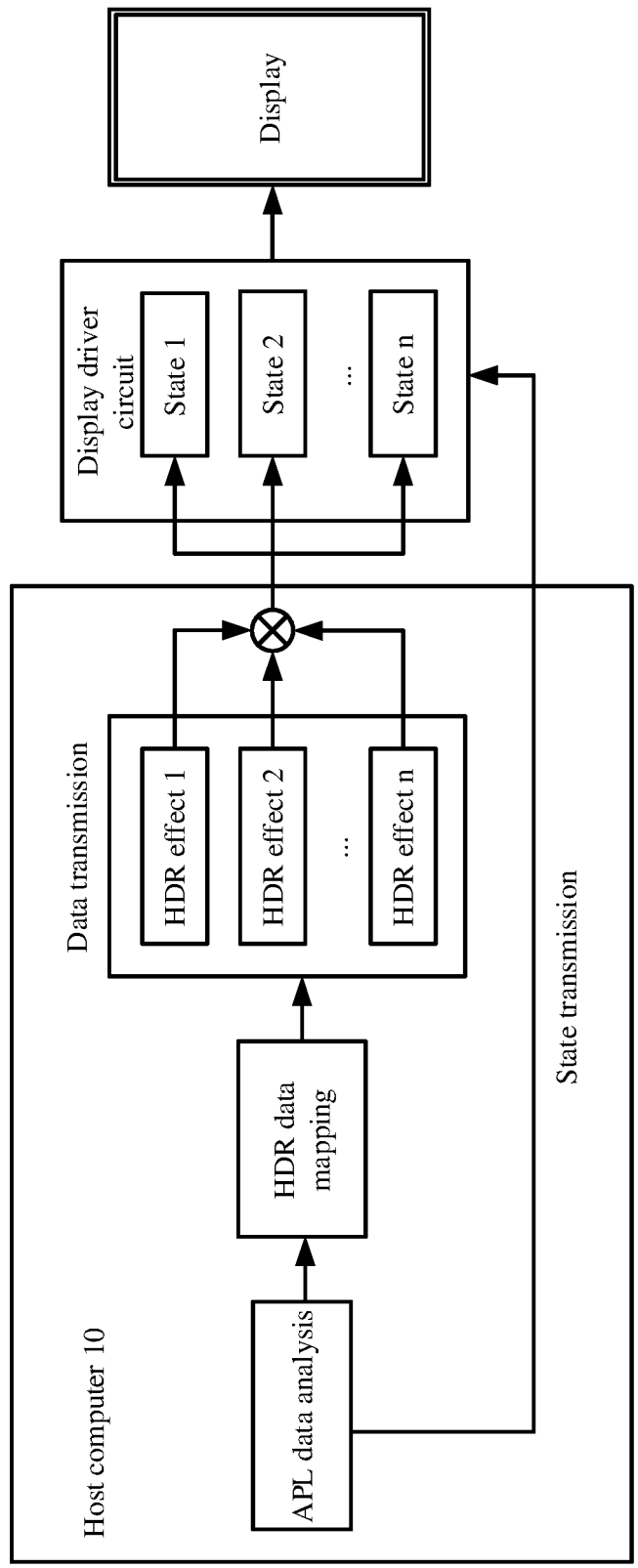
FIG. 29 is a schematic diagram of an application scenario of a display drive method according to another embodiment of this application.

FIG. 29 is a schematic diagram of an application scenario of a display drive method based on frame data according to another embodiment of this application. A host computer 10 is a processor or includes a processor and a digital signal processor. When receiving to-be-displayed frame data, the host computer performs APL data analysis on the frame data, calculates an APL percentage of the frame data, and transmits, to the display driver circuit, an APL interval in which the APL percentage falls. In addition, the host computer determines a corresponding HDR effect curve based on the APL interval in which the APL percentage falls, performs HDR processing on the frame data based on the determined HDR effect curve, to obtain grayscale data of each pixel in the frame data, and transmits, to the display driver circuit, the frame data including the grayscale data of each pixel together with APL interval information in which the APL percentage falls. The display driver circuit sets, based on the APL interval in which the APL percentage falls and the processed frame data, a display parameter of the display, so that brightness of the display is the highest brightness that can be reached within the APL interval. Then, the display driver circuit drives, based on the set display parameter of the display, the display to display the frame data, where display brightness of the display is a DBV threshold, and each pixel in the frame data has brightness and a tone in the set to-be-displayed grayscale data. Display brightness of a pixel with the highest initial brightness on the display is peak brightness, and a pixel with relatively high initial brightness also has relatively high display brightness on the display, and conforms to an HDR curve, to achieve effects of local highlight display and HDR display.

As shown in FIG. 19, the host computer 10 is a processor, and the processor receives to-be-displayed frame data. After receiving the to-be-displayed frame data, the processor analyzes the frame data, calculates an APL percentage of the frame data, and transmits, to the display driver circuit, an APL interval in which the APL percentage falls. In addition, the processor determines a corresponding HDR effect curve based on the APL interval in which the APL percentage falls, performs HDR processing on the frame data based on the determined HDR effect curve, to obtain grayscale data of each pixel in the frame data, and transmits, to the display driver circuit, the frame data including the grayscale data of each pixel together with APL interval information. The display driver circuit sets, based on the APL interval in which the APL percentage falls and the processed frame data, a display parameter of the display, so that brightness of the display is the highest brightness that can be reached within the APL interval. Then, the display driver circuit drives, based on the set display parameter of the display, the display to display the frame data, where display brightness of the display is a DBV threshold, and each pixel in the frame data has brightness and a tone in the set to-be-displayed grayscale data. Display brightness of a pixel with the highest initial brightness on the display is peak brightness, and a pixel with relatively high initial brightness also has relatively high display brightness on the display, and conforms to an HDR curve, to achieve effects of local highlight display and HDR display.

As shown in FIG. 22, the host computer 10 includes a processor and a digital signal processor. The processor receives to-be-displayed frame data, and transmits the to-be-displayed frame data to the digital signal processor. After receiving the to-be-displayed frame data, the digital signal processor analyzes the frame data, calculates an APL percentage of the frame data, and transmits, to the display driver circuit, APL interval information in which the APL percentage falls. In addition, the digital signal processor transmits, to the processor, the APL interval information in which the APL percentage falls. The processor determines a corresponding HDR effect curve based on an APL interval in which the APL percentage falls, performs processing on the frame data based on the determined HDR effect curve, to obtain grayscale data of each pixel obtained through tone mapping processing in the frame data, and transmits, to the digital signal processor, the frame data including the grayscale data of each pixel. The digital signal processor transmits, to the display driver circuit, the frame data including the grayscale data of each pixel together with the APL interval information in which the APL percentage falls. The display driver circuit sets, based on the APL interval in which the APL percentage falls and the frame data obtained through HDR processing, a display parameter of the display, so that brightness of the display is the highest brightness that can be reached within the APL interval. Then, the display drive circuit drives, based on the set display parameter of the display, the display to display the frame data, where display brightness of the display is a DBV threshold, and each pixel in the frame data has brightness and a tone in set grayscale data. Display brightness of a pixel with the highest initial brightness on the display is peak brightness, and a pixel with relatively high initial brightness also has relatively high display brightness on the display, and conforms to an HDR curve, to achieve effects of local highlight display and HDR display.

As shown in FIG. 25, the host computer 10 is a processor, and the processor receives to-be-displayed frame data. After receiving the to-be-displayed frame data, the processor analyzes the frame data, calculates an APL percentage of the frame data, and determines a corresponding HDR effect curve based on an APL interval in which the APL percentage falls. The processor performs processing on the frame data based on the determined HDR effect curve, to obtain grayscale data of each pixel obtained through HDR processing in the frame data, and transmits, to the display driver circuit, the frame data including the grayscale data of each pixel. The display driver circuit calculates an APL percentage of the displayed frame data, and sets, based on the APL interval in which the APL percentage falls and the frame data obtained through HDR processing, a display parameter of the display, so that brightness of the display is the highest brightness that can be reached within the APL interval. Then, the display driver circuit drives, based on the set display parameter, the display to display the frame data, where display brightness of the display is a DBV threshold, and each pixel in the frame data has brightness and a tone in the set to-be-displayed grayscale data. Display brightness of a pixel with the highest initial brightness on the display is peak brightness, and a pixel with relatively high initial brightness also has relatively high display brightness on the display, and conforms to an HDR curve, to achieve effects of local highlight display and HDR display.

Figure 30:
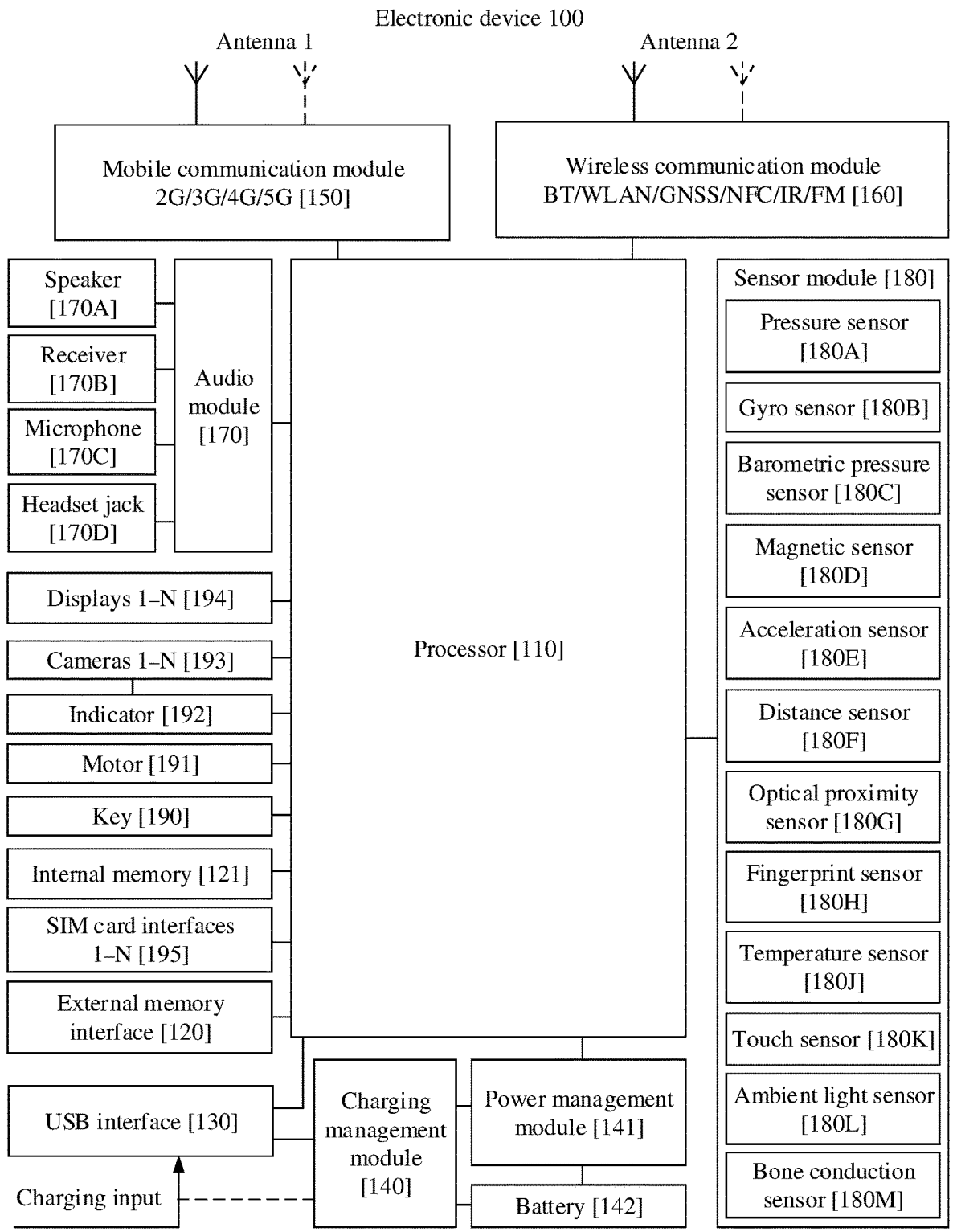
FIG. 30 is a diagram of a hardware architecture of an electronic device according to an embodiment of this application

As shown in FIG. 30, the electronic device 100 may be a mobile phone, a tablet computer, a desktop computer, a laptop computer, a handheld computer, a notebook computer, an ultra-mobile personal computer (Ultra-mobile Personal Computer, UMPC), a netbook, a cellular phone, a personal digital assistant (Personal Digital Assistant, PDA), an augmented reality (Augmented Reality, AR) device, a virtual reality (Virtual Reality, VR) device, an artificial intelligence (Artificial Intelligence, AI) device, a wearable device, a vehicle-mounted device, a smart home device, and/or a smart city device. A specific type of the electronic device 100 is not specifically limited in embodiments of this application.

The electronic device 100 may include a processor 110, an external memory interface 120, an internal memory 121, a universal serial bus (Universal Serial Bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, and a subscriber identity module (Subscriber Identification Module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment of the present invention does not constitute a specific limitation on the electronic device 100. In some other embodiments of this application, the electronic device 100 may include more or fewer components than those shown in the figure, or combine some components, or split some components, or have different component arrangements. The illustrated components may be implemented by using hardware, software or a combination of software and hardware.

The processor 110 may include one or more processing units. For example, the processor 110 may include an application processor (Application Processor, AP), a modem processor, a graphics processing unit (Graphics Processing Unit, GPU), an image signal processor (Image Signal Processor, ISP), a controller, a video codec, a digital signal processor (Digital Signal Processor, DSP), a baseband processor, and/or a neural-network processing unit (Neural-network Processing Unit, NPU). Different processing units may be independent devices, or may be integrated into one or more processors.

The controller can generate an operation control signal based on instruction operation codes and a timing signal, and complete the control of fetching and executing instructions.

The processor 110 may be further provided with a memory for storing instructions and data. In some embodiments, the memory in the processor 110 is a cache. The memory can store an instruction or data that the processor 110 has just used or used cyclically. If the processor 110 needs to use the instruction or data again, the instruction or data can be directly invoked from the memory. Repeated access is avoided, and waiting time of the processor 110 is reduced, thereby improving system efficiency.

In some embodiments, the processor 110 may include one or more interfaces. The interface may include an inter-integrated circuit (Inter-integrated Circuit, I2C) interface, an inter-integrated circuit sound (Inter-integrated Circuit Sound, I2S) interface, a pulse code modulation (Pulse Code Modulation, PCM) interface, and a universal asynchronous receiver/transmitter (universal asynchronous receiver/transmitter, UART) interface, a mobile industry processor interface (Mobile Industry Processor Interface, MIPI), a general-purpose input/output (General-Purpose Input/Output, GPIO) interface, a subscriber identity module (Subscriber Identity Module, SIM) interface, a universal serial bus (Universal Serial Bus, USB) interface, and/or the like.

The I2C interface is a bidirectional synchronous serial bus, including a serial data line (Serial Data Line, SDA) and a serial clock line (Derail Clock Line, SCL).

The I2S interface may be configured to perform audio communication.

The PCM interface may also be configured to perform audio communication to sample, quantize, and encode analog signals.

The UART interface is a universal serial data bus used for asynchronous communication. The bus may be a bidirectional communication bus. The bus converts to-be-transmitted data between serial communication and parallel communication.

The MIPI interface may be configured to connect the processor 110 to peripheral devices such as the display 194 and the camera 193. The MIPI interface includes a camera serial interface (Camera Serial Interface, CSI), a display serial interface (Display Serial Interface, DSI), and the like. The processor 110 and the display 194 communicate with each other through the DSI interface, to implement a display function of the electronic device 100.

The GPIO interface may be configured by using software. The GPIO interface may be configured as a control signal interface, or may be configured as a data signal interface. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that complies with USB standard specifications, and may be specifically a Mini USB interface, a Micro USB interface, a USB Type C interface, or the like. The USB interface 130 may be configured to connect to the charger to charge the electronic device 100, or may be configured to transmit data between the electronic device 100 and peripheral devices. The USB interface 130 may be further configured to connect a headset and play audio by using the headset. The interface may be further configured to connect to another electronic device 100, such as an AR device.

It may be understood that the interface connection relationship between the modules illustrated in embodiments of the present invention is merely an example for description, and does not constitute a limitation on the structure of the electronic device 100. In some other embodiments of this application, the electronic device 100 may alternatively use an interface connection mode that is different from those in the foregoing embodiments, or use a combination of a plurality of interface connection modes.

The electronic device 100 implements a display function by using the GPU, the display 194, the application processor, and the like. The GPU is an image processing microprocessor, which is connected to the display 194 and the application processor. The GPU is configured to perform mathematical and geometric calculations to render graphics. The processor 110 may include one or more GPUs that execute program instructions to generate or change display information.

The display 194 is configured to display an image, a video, and the like. The display 194 includes a display panel. The display panel may be a liquid crystal display (Liquid Crystal Display, LCD), an organic light-emitting diode (Organic Light-Emitting Diode, OLED), an active-matrix organic light emitting diode (Active-Matrix Organic Light Emitting Diode, AMOLED), a flexible light-emitting diode (Flex Light-Emitting Diode, FLED), a Miniled, a Microled, a Micro-OLED, quantum dot light emitting diodes (Quantum Dot Light Emitting Diodes, QLED), or the like. In some embodiments, the electronic device 100 may include one or N displays 194, where N is a positive integer greater than 1.

The digital signal processor is configured to process a digital signal. In addition to processing a digital image signal, the digital signal processor can further process another digital signal. For example, when the electronic device 100 selects a frequency, the digital signal processor is configured to perform Fourier transform or the like on energy of the frequency.

The internal memory 121 may include one or more random access memories (Random Access Memory, RAM) and one or more non-volatile memories (Non-Volatile Memory, NVM).

The random access memory may include a static random access memory (Static Random-Access Memory, SRAM), a dynamic random access memory (Dynamic Random Access Memory, DRAM), a synchronous dynamic random access memory (Synchronous Dynamic Random Access Memory, SDRAM), a double data rate synchronous dynamic random access memory (Double Data Rate Synchronous Dynamic Random Access Memory, DDR SDRAM, for example, a fifth generation DDR SDRAM, which is generally referred to as a DDR5 SDRAM), and the like.

The non-volatile memory may include a disk storage device and a flash memory (flash memory).

The flash memory may be classified, based on an operating principle, into an NOR FLASH, an NAND FLASH, a 3D NAND FLASH, and the like; may be classified, based on a quantity of electric potential levels of a cell, into a single-level cell (Single-Level Cell, SLC), a multi-level cell (Multi-Level Cell, MLC), a third-level cell (Triple-Level Cell, TLC), a fourth-level cell (Quad-Level Cell, QLC), and the like; or may be classified, based on a storage specification, into a universal flash storage (Universal Flash Storage, UFS), an embedded multimedia card (Embedded Multi Media Card, eMMC), and the like.

The random access memory may be directly read and written by the processor 110, and may be configured to store an executable program (for example, a machine instruction) of an operating system or another running program, and may be further configured to store data of a user and data of an application, and the like.

The non-volatile memory may also store an executable program, data of a user, data of an application, and the like, which may be loaded into the random access memory in advance for directly reading and writing by the processor 110.

The external memory interface 120 may be configured to connect to an external non-volatile memory, to expand a storage capacity of the electronic device 100. The external non-volatile memory card communicates with the processor 110 by using the external memory interface 120, to implement a data storage function. For example, music, video, and other files are stored in the external non-volatile memory.

The internal memory 121 or the external memory interface 120 is configured to store one or more computer programs. One or more computer programs are configured to be executed by the processor 110. The one or more computer programs include a plurality of instructions. When the plurality of instructions are executed by the processor 110, the display drive method based on frame data performed on the electronic device 100 in the foregoing embodiments may be implemented, to implement a display drive function based on frame data on the electronic device 100.

This embodiment further provides a computer storage medium, where the computer storage medium stores a computer instruction, and when the computer instruction is run on the electronic device 100, the electronic device 100 is enabled to perform the foregoing related method steps, so as to implement the display drive method based on frame data in the foregoing embodiments.

This embodiment further provides a computer program product. When the computer program product is run on a computer, the computer performs the foregoing related steps, so as to implement the display drive method based on frame data in the foregoing embodiments.

In addition, an embodiment of this application further provides an apparatus, where the apparatus may specifically be a chip, a component, or a module; and the apparatus may include a processor and a memory that are connected, where the memory is configured to store a computer execution instruction, and when the apparatus operates, the processor may execute the computer execution instruction stored in the memory, so that the chip performs the display drive method based on frame data in the foregoing method embodiments.

The electronic device, the computer storage medium, the computer program product, or the chip provided in this embodiment are all configured to perform the corresponding methods provided above. Therefore, for the beneficial effects that can be achieved by the electronic device, the computer storage medium, the computer program product, or the chip, reference may be made to the beneficial effects in the corresponding methods provided above, and details are not described herein again.

The foregoing descriptions about implementations allow a person skilled in the art to clearly understand that, for the purpose of convenient and brief description, division of the foregoing functional modules is used only as an example for illustration. In actual application, the foregoing functions can be allocated to different functional modules and implemented according to needs, that is, an inner structure of an apparatus is divided into different functional modules to implement all or some of the functions described above.

In embodiments provided in this application, it should be understood that the disclosed apparatus and method may be implemented in another manner. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The unit described as a separate component may be or may not be physically separate. A component displayed as a unit may be one physical unit or a plurality of physical units, that is, the component may be located in one position, or may be distributed in a plurality of different positions. Some or all of the units may be selected according to actual needs to achieve the objectives of the solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the existing technology, or all or some of the technical solutions may be implemented in a form of a software product. The software product is stored in a storage medium and includes instructions for instructing a device (which may be a single-chip microcomputer, a chip, or the like) or a processor (processor) to perform all or some of the steps of the methods in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are only used to describe the technical solutions of this application, but not intended to constitute any limitation. Although this application is described in detail with reference to the foregoing example embodiments, a person of ordinary skill in the art should understand that modifications or equivalent replacements can be made to the technical solutions of this application without departing from the spirit and scope of the technical solutions of this application.

What is claimed is:

1. A display drive method based on frame data, comprising:
    receiving to-be-displayed frame data, and calculating an Average Picture Level (APL) percentage of the frame data by using an analysis unit;
    performing High Dynamic Range (HDR) processing on the frame data based on the APL percentage of the frame data, and transmitting the frame data obtained through HDR processing to a display driver circuit; and
    driving, by the display driver circuit based on the APL percentage of the frame data, a display to display the frame data obtained through HDR processing,
    wherein, after calculating an APL percentage of the frame data by using an analysis unit the method further comprises:
    if the analysis unit is a processor or a digital signal processor, transmitting, to the display driver circuit by using the analysis unit, APL interval information in which the APL percentage of the frame data falls, and
    wherein the transmitting, to the display driver circuit by using the analysis unit, APL interval information in which the APL percentage of the frame data falls comprises;
    determining an APL interval in which the APL percentage of the frame data falls;
    generating a corresponding status command based on APL interval information in which the APL percentage of the frame data falls, and
    transmitting the status command to the display driver circuit.

2. The display drive method based on frame data according to claim 1, wherein the calculating an APL percentage of the frame data by using an analysis unit comprises:
    calculating, by the analysis unit, a sum of ratios of grayscale values of all pixels of the frame data to a quantity of pixels, to obtain an APL percentage of the frame data.

3. The display drive method based on frame data according to claim 2, wherein the calculating an APL percentage of the frame data by using an analysis unit further comprises:
    determining, by the analysis unit based on the APL percentage of the frame data and a preset coefficient, a display APL percentage of the frame data.

4. The display drive method based on frame data according to claim 1, wherein the analysis unit is a processor or a digital signal processor, or comprises the processor and the display driver circuit.

5. The display drive method based on frame data according to claim 1, wherein the generating a corresponding status command comprises:
    recording, in a CMD command, the APL interval information in which the APL percentage of the frame data falls, and using the CMD command recording the APL interval information as a status command corresponding to the APL interval.

6. The display drive method based on frame data according to claim 5, wherein the transmitting the status command to the display driver circuit comprises:
    transmitting, to the display driver circuit in a preset time sequence, the status command together with the frame data.

7. The display drive method based on frame data according to claim 6, wherein the transmitting, to the display driver circuit in a preset time sequence, the status command together with the frame data comprises:
    placing the status command at a start location or an end location of to-be-transmitted frame data;
    forming, by the frame data comprising the status command, a data stream in a time sequence, and transmitting, to the display driver circuit in a time sequence, the frame data comprising the status command;
    determining whether a feedback signal of the display driver circuit is received; and
    if it is determined that the feedback signal of the display driver circuit is received, transmitting, in a time sequence, next frame data that comprises a status command and that is in the data stream; or
    if it is determined that no feedback signal of the display driver circuit is received, suspending transmission of the frame data in the data stream.

8. The display drive method based on frame data according to claim 1, wherein the generating a corresponding status command comprises:
    determining a quantity of pulses based on the APL interval in which the APL percentage of the frame data falls; generating, based on the quantity of pulses, a Pulse Width Modulation (PWM) signal by using a General-Purpose Input/Output (GPIO) interface; and using the PWM signal as a status command corresponding to the APL interval.

9. The display drive method based on frame data according to claim 1, wherein the transmitting the status command to the display driver circuit comprises:
    transmitting the status command to the display driver circuit by using a mobile industry processor interface, a general-purpose input/output interface, a serial transmission bus, an improved serial transmission bus, or a serial peripheral interface.

10. An electronic device, wherein the electronic device comprises a memory and a processor, wherein
the memory is configured to store a program instructions that, when executed by the processor, enable the electronic device to perform the display drive method based on frame data according to claim 1.

11. A non-transitory, computer storage medium, storing program instructions that, when executed by an electronic device, enable the electronic device to perform the display drive method based on frame data according to claim 1.

12. A display drive method based on frame data, wherein the method comprises:
receiving to-be-displayed frame data, and calculating an Average Picture Level (APL) percentage of the frame data by using an analysis unit,
performing High Dynamic Range (HDR) processing on the frame data based on the APL percentage of the frame data, and transmitting the frame data obtained through HDR processing to a display driver circuit; and
driving, by the display driver circuit based on the APL percentage of the frame data, a display to display the frame data obtained through HDR processing, wherein
the performing HDR processing on the frame data based on the APL percentage of the frame data, and transmitting the frame data obtained through HDR processing to the display driver circuit comprises:
determining an HDR effect curve based on an APL interval in which the APL percentage of the frame data falls;
performing HDR processing on the frame data based on the HDR effect curve; and
transmitting the frame data obtained through HDR processing to the display driver circuit.

13. The display drive method based on frame data according to claim 12, wherein the determining an HDR effect curve based on an APL interval in which the APL percentage of the frame data falls comprises:
determining, based on the APL interval in which the APL percentage of the frame data falls and a correspondence between a preset APL interval and threshold brightness of the display, threshold brightness corresponding to the APL interval; and determining, from a plurality of preset HDR effect curves, an HDR effect curve corresponding to the threshold brightness.

14. The display drive method based on frame data according to claim 13, wherein the performing HDR processing on the frame data based on the HDR effect curve comprises:
performing tone mapping processing on the frame data based on the determined HDR effect curve, and mapping initial grayscale data of each pixel in the frame data to grayscale data within a display brightness range of the display, wherein the grayscale data comprises brightness and a tone.

15. The display drive method based on frame data according to claim 14, wherein the driving, by the display driver circuit based on the APL percentage of the frame data, a display to display the frame data obtained through HDR processing comprises:
setting a display parameter of the display based on the APL interval in which the APL percentage of the frame data falls; and
driving, based on the display parameter, the display to display the frame data through HDR processing.

16. The display drive method based on frame data according to claim 15, wherein the display parameter comprises a display brightness threshold and the grayscale data of the pixel, and the setting a display parameter of the display based on the APL interval in which the APL percentage of the frame data falls comprises:
determining, based on a correspondence between the APL interval and the display brightness threshold, a display brightness threshold corresponding to the APL interval in which the APL percentage of the frame data falls;
obtaining grayscale data of each pixel in the frame data obtained through HDR processing; and
setting a display brightness value of the display to the display brightness threshold, and setting to-be-displayed grayscale data of each pixel in the frame data to the grayscale data obtained through tone mapping.

17. The display drive method based on frame data according to claim 16, wherein the driving, based on the display parameter, the display to display the frame data obtained through HDR processing comprises:
driving, by the display driver circuit, the display to display, by using the display brightness threshold, the frame data obtained through HDR processing, so that brightness of each pixel in the frame data displayed on the display reaches set brightness in the grayscale data, and a tone of each pixel in the frame data displayed on the display reaches a set tone in the grayscale data.

18. The display drive method based on frame data according to claim 17, wherein the display parameter further comprises a local Gamma value of the frame data obtained through HDR processing, and the driving, based on the display parameter, the display to display the frame data obtained through HDR processing comprises:
driving, by the display driver circuit, the display to display, by using the display brightness threshold, the frame data obtained through HDR processing, so that the brightness of each pixel in the frame data displayed on the display reaches the set brightness in the grayscale data, and the tone of each pixel in the frame data displayed on the display reaches the set tone in the grayscale data; and performing local Gamma correction on the displayed frame data based on the local Gamma value.

* * * * *